United States Patent
Tzannes

(10) Patent No.: US 10,567,112 B2
(45) Date of Patent: Feb. 18, 2020

(54) IMPULSE NOISE MANAGEMENT

(71) Applicant: TQ DELTA, LLC, Austin, TX (US)

(72) Inventor: Marcos C. Tzannes, Petaluma, CA (US)

(73) Assignee: TQ DELTA, LLC, Austin, TX (US)

(*) Notice: Subject to any disclaimer, the term of this patent is extended or adjusted under 35 U.S.C. 154(b) by 0 days.

(21) Appl. No.: 16/126,027

(22) Filed: Sep. 10, 2018

(65) Prior Publication Data

US 2019/0007164 A1  Jan. 3, 2019

Related U.S. Application Data

(63) Continuation of application No. 14/757,630, filed on Dec. 23, 2015, now abandoned, which is a
(Continued)

(51) Int. Cl.
*H04L 1/00* (2006.01)
*H04L 1/20* (2006.01)
(Continued)

(52) U.S. Cl.
CPC .......... *H04L 1/0015* (2013.01); *H04B 15/00* (2013.01); *H04L 1/0009* (2013.01);
(Continued)

(58) Field of Classification Search
CPC ... H04L 1/0015; H04L 1/0009; H04L 1/0025; H04L 1/20; H04L 1/0075; H04L 5/006; H04L 1/0023; H04L 1/0071; H04B 15/00
See application file for complete search history.

(56) References Cited

U.S. PATENT DOCUMENTS 3,699,457 A  10/1972  Wright
4,541,091 A   9/1985  Nishida et al.
(Continued)

FOREIGN PATENT DOCUMENTS

EP  0696108 A1  2/1996
EP  0923821 B1  9/2003
(Continued)

OTHER PUBLICATIONS

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Feb. 11, 2019-May 9, 2019; Docket Nos. 699-1139; (12,491 pages).
(Continued)

*Primary Examiner* — Jean B Corrielus
(74) *Attorney, Agent, or Firm* — Jason H. Vick; Sheridan Ross, PC

(57) ABSTRACT

A discrete multitone transceiver (DMT) includes a deinterleaver operable to de-interleave a plurality of bits. The DMT further includes: a forward error correction decoder operable to decode the plurality of bits, a module operable to determine, during Showtime, an impulse noise protection value, wherein the impulse protection value specifies a number corrupted DMT symbols that can be corrected by the forward error correction decoder in combination with the deinterleaver, and a receiver coupled to the deinterleaver. The receiver receives using a first interleaver parameter value, receives a flag signal, and changes to receiving using a second interleaver parameter value that is different than the first interleaver parameter value, wherein the second interleaver parameter value is used for reception on a pre-defined forward error correction codeword boundary following reception of the flag signal.

21 Claims, 7 Drawing Sheets

Related U.S. Application Data continuation of application No. 14/285,911, filed on May 23, 2014, now abandoned, which is a continuation of application No. 14/075,077, filed on Nov. 8, 2013, now Pat. No. 8,743,932, which is a continuation of application No. 13/914,852, filed on Jun. 11, 2013, now Pat. No. 8,594,162, which is a continuation of application No. 12/769,193, filed on Apr. 28, 2010, now Pat. No. 8,462,835, which is a continuation of application No. 10/597,482, filed as application No. PCT/US2005/006842 on Mar. 3, 2005, now abandoned.

(60) Provisional application No. 60/549,804, filed on Mar. 3, 2004, provisional application No. 60/555,982, filed on Mar. 24, 2004.

(51) Int. Cl.
*H04B 15/00* (2006.01)
*H04L 5/00* (2006.01)

(52) U.S. Cl.
CPC .......... *H04L 1/0023* (2013.01); *H04L 1/0025* (2013.01); *H04L 1/0075* (2013.01); *H04L 1/20* (2013.01); *H04L 5/006* (2013.01); *H04L 1/0071* (2013.01)

(56) References Cited

U.S. PATENT DOCUMENTS

| | | | |
|---|---|---|---|
| 4,581,746 A | 4/1986 | Arnold | |
| 4,644,544 A | 2/1987 | Furuya et al. | |
| 4,677,622 A | 6/1987 | Okamoto et al. | |
| 4,716,567 A | 12/1987 | Ito et al. | |
| 4,748,628 A * | 5/1988 | Moriwaki | G11B 20/1809 714/756 |
| 4,845,466 A | 7/1989 | Hariton et al. | |
| 4,979,174 A | 12/1990 | Cheng et al. | |
| 5,214,501 A | 5/1993 | Cavallerano et al. | |
| 5,287,384 A | 2/1994 | Avery et al. | |
| 5,351,016 A | 9/1994 | Dent | |
| 5,392,299 A | 2/1995 | Rhines et al. | |
| 5,420,640 A | 5/1995 | Munich et al. | |
| 5,422,913 A | 6/1995 | Wilkinson | |
| 5,436,917 A * | 7/1995 | Karasawa | G11B 20/1876 714/708 |
| 5,490,168 A | 2/1996 | Phillips et al. | |
| 5,537,437 A | 7/1996 | Kaku et al. | |
| 5,546,411 A | 8/1996 | Leitch et al. | |
| 5,596,604 A | 1/1997 | Cioffi et al. | |
| 5,635,864 A | 6/1997 | Jones | |
| 5,638,384 A | 6/1997 | Hayashi et al. | |
| 5,675,585 A | 10/1997 | Bonnot et al. | |
| 5,699,365 A | 12/1997 | Klayman et al. | |
| 5,745,275 A | 4/1998 | Giles et al. | |
| 5,751,338 A | 5/1998 | Ludwig, Jr. | |
| 5,764,649 A | 6/1998 | Tong | |
| 5,764,693 A | 6/1998 | Taylor et al. | |
| 5,765,127 A | 6/1998 | Nishiguchi et al. | |
| 5,793,759 A | 8/1998 | Rakib et al. | |
| 5,794,136 A | 8/1998 | Buchwald et al. | |
| 5,828,677 A | 10/1998 | Sayeed et al. | |
| 5,835,527 A | 11/1998 | Lomp | |
| 5,903,612 A | 5/1999 | Van Der Puttent et al. | |
| 5,905,874 A | 5/1999 | Johnson | |
| 5,907,563 A | 5/1999 | Takeuchi et al. | |
| 5,917,340 A | 6/1999 | Manohar et al. | |
| 5,995,539 A | 11/1999 | Miller | |
| 6,041,057 A | 3/2000 | Stone | |
| 6,067,646 A | 5/2000 | Starr | |
| 6,081,291 A | 6/2000 | Ludwig, Jr. | |
| 6,226,322 B1 | 5/2001 | Mukherjee | |
| 6,266,348 B1 | 7/2001 | Gross et al. | |
| 6,308,278 B1 | 10/2001 | Khouli et al. | |
| 6,421,323 B1 | 7/2002 | Nelson et al. | |
| 6,473,418 B1 | 10/2002 | Laroia et al. | |
| 6,477,669 B1 | 11/2002 | Agarwal et al. | |
| 6,498,808 B1 | 12/2002 | Tzannes | |
| 6,546,509 B2 | 4/2003 | Starr | |
| 6,553,534 B2 | 4/2003 | Yonge, III et al. | |
| 6,578,162 B1 | 6/2003 | Yung | |
| 6,598,188 B1 * | 7/2003 | Locke | H03M 13/1515 714/704 |
| 6,640,239 B1 | 10/2003 | Gidwani | |
| 6,647,070 B1 | 11/2003 | Shalvi et al. | |
| 6,654,410 B2 | 11/2003 | Tzannes | |
| 6,657,949 B1 | 12/2003 | Jones, IV et al. | |
| 6,683,855 B1 | 1/2004 | Bordogna et al. | |
| 6,700,881 B1 | 3/2004 | Kong et al. | |
| 6,732,323 B1 | 5/2004 | Mitlin et al. | |
| 6,742,154 B1 | 5/2004 | Barnard | |
| 6,754,290 B1 | 6/2004 | Halter | |
| 6,772,388 B2 | 8/2004 | Cooper et al. | |
| 6,788,923 B2 | 9/2004 | Tsujishita et al. | |
| 6,904,537 B1 | 6/2005 | Gorman | |
| 6,920,194 B2 | 7/2005 | Stopler et al. | |
| 6,928,603 B1 | 8/2005 | Castagna et al. | |
| 6,982,964 B1 | 1/2006 | Beering | |
| 6,983,414 B1 | 1/2006 | Duschatko et al. | |
| 6,992,503 B2 | 1/2006 | Madurawe | |
| 7,024,592 B1 | 4/2006 | Voas et al. | |
| 7,024,596 B2 | 4/2006 | Xin | |
| 7,050,419 B2 | 5/2006 | Azenkot et al. | |
| 7,103,820 B2 | 9/2006 | Polk, Jr. et al. | |
| 7,103,828 B2 | 9/2006 | Polk, Jr. et al. | |
| 7,162,676 B2 | 1/2007 | Coleman et al. | |
| 7,170,432 B2 | 1/2007 | Ettorre | |
| 7,181,177 B2 | 2/2007 | Pauli et al. | |
| 7,197,067 B2 | 3/2007 | Lusky et al. | |
| 7,200,138 B2 | 4/2007 | Liu | |
| 7,203,206 B2 | 4/2007 | Amidan et al. | |
| 7,257,764 B2 | 8/2007 | Suzuki et al. | |
| 7,278,081 B1 | 10/2007 | Blair et al. | |
| 7,343,543 B2 | 3/2008 | Mantha et al. | |
| 7,372,901 B2 | 5/2008 | Holcomb et al. | |
| 7,383,486 B1 | 6/2008 | Castagna et al. | |
| 7,400,688 B2 | 7/2008 | Garrett | |
| 7,418,240 B2 | 8/2008 | Hsu et al. | |
| 7,428,669 B2 | 9/2008 | Cioffi | |
| 7,673,221 B2 | 3/2010 | Li et al. | |
| 7,706,287 B2 | 4/2010 | Tanaka | |
| 7,940,798 B2 | 5/2011 | Puputti et al. | |
| 8,462,835 B2 | 6/2013 | Tzannes | |
| 8,521,142 B2 | 8/2013 | Sollissi et al. | |
| 8,594,162 B2 | 11/2013 | Tzannes | |
| 8,743,932 B2 | 6/2014 | Tzannes | |
| 2001/0022810 A1 | 9/2001 | Joo | |
| 2001/0033611 A1 | 10/2001 | Grimwood et al. | |
| 2002/0015401 A1 | 2/2002 | Subramanian et al. | |
| 2002/0015421 A1 | 2/2002 | Abbas et al. | |
| 2002/0041570 A1 | 4/2002 | Ptasinski et al. | |
| 2002/0069038 A1 | 6/2002 | Cooper | |
| 2002/0080867 A1 | 6/2002 | Abbas et al. | |
| 2002/0150167 A1 | 10/2002 | Demjanenko et al. | |
| 2003/0021237 A1 | 1/2003 | Min et al. | |
| 2003/0131209 A1 | 7/2003 | Lee | |
| 2003/0174764 A1 | 9/2003 | Mahany | |
| 2003/0182664 A1 | 9/2003 | Lusky et al. | |
| 2003/0193889 A1 | 10/2003 | Jacobsen | |
| 2004/0120435 A1 | 6/2004 | Yang et al. | |
| 2004/0213256 A1 | 10/2004 | Muys et al. | |
| 2005/0079889 A1 | 4/2005 | Vaglica et al. | |
| 2005/0138524 A1 | 6/2005 | Cioffi | |
| 2005/0220180 A1 | 10/2005 | Barlev et al. | |
| 2006/0078044 A1 | 4/2006 | Norrell et al. | |
| 2007/0258487 A1 | 11/2007 | Puputti | |
| 2008/0037541 A1 | 2/2008 | Souissi et al. | |
| 2008/0232444 A1 | 9/2008 | Tzannes | |
| 2009/0086800 A1 | 4/2009 | Cioffi | |
| 2010/0229075 A1 | 9/2010 | Yousef et al. | |

(56) References Cited

U.S. PATENT DOCUMENTS

| | | |
|---|---|---|
| 2014/0254643 A1 | 9/2014 | Tzannes |
| 2016/0127079 A1 | 5/2016 | Tzannes |

FOREIGN PATENT DOCUMENTS

| | | |
|---|---|---|
| WO | WO 98/47238 | 10/1998 |
| WO | WO 00/41395 | 7/2000 |
| WO | WO 01/11833 | 2/2001 |

OTHER PUBLICATIONS

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Feb. 13, 2019-May 8, 2019; Docket Nos. 618-628; (21 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 22, 2019-May 9, 2019; Docket Nos. 554-573 (36 pages).
Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Feb. 22, 2019-May 9, 2019; Docket Nos. 553-571 (35 pages).
U.S. Appl. No. 60/078,549, filed Mar. 19, 1998, Jacobsen et al.
Bauer, Rainer et al. "Iterative Source/Channel-Decoding Using Reversible Variable Length Codes" Munich University of Technology, 2000 (10 pages).
Business Wire "New FatPipe T1 Speed Product Produces Speeds up to 4.5Mbps and Redundancy for a Fraction of the Cost of a Fractional T3!" Business Wire, Oct, 16, 1998 (2 pages).
Cisco Systems, Inc. "Alternatives for High Bandwidth Connections Using Parallel T1/E1 Links" 1998 (8 pages).
Goodman, David et al. "Maximizing the Throughput to CDMA Data Communications" Polytechnic University, Brooklyn, NY, Oct. 2003 (5 pages).
Halvorsen, Pal "Improving I/O Performance of Multimedia Servers" University of Oslo, Norway, Aug. 1, 2001 (140 pages).
ITU-T, G.992.1, Series G: Transmission Systems and Media, Digital Systems and Networks, "Asymmetric Digital Subscriber Line (ADSL) Transceivers" Jun. 1999 (256 pages).
ITU-T, G.992.3, Series G: Transmission Systems and Media, Digital Systems and Networks, Asymmetric Digital Subscriber Line Transceivers 2 (ADSL2) Jul. 2002 (312 pages).
ITU-T, G.993.1, Series G: Transmission Systems and Media, Digital Systems and Networks, International Telecommunication Union, Revision 2004.
ITU-T Recommendation G.992.3, "Asymmetric Digital Subscriber Line Transceivers 2 (ADSL2)" International Telecommunication Union, Apr. 2009, 404 pages.
ITU-T Recommendation G.992.3 Annex C, "Annex C: Specific Requirements for an ADSL System Operating in the Same Cable as ISDN as Defined in Appendix III of Recommendation ITU-T G.961" International Telecommunication Union, Apr. 2009, 296 pages.
Johns, David A., et al. "Integrated Circuits for Data Transmission Over Twisted-Pair Channels" IEEE Journal of Solid-State Circuits, vol. 32, Nov. 3, Mar. 1997 (9 pages).
Lattuada, Mauro "Turbo Coded OFDM System for Video Terrestrial Broadcasting" LTS3-ITS-STI EPFL Ecublens, 1015 Switzerland, Feb. 11, 2003 (6 pages).
Lee, M.K. et al. "HomePlug 1.0 Powerline Communication LANs—Protocol Description and Performance Results Version 5.4" International Journal of Communication Systems, V1.01; Sep. 18, 2002 (25 pages).
Petzold, Mark C. et al, "Multicarrier Spread Spectrum Performance in Fading Channels with Serial Concatenated Convolutional Coding" IEEE 1998 (4 pages).
Proposed revisions to G.992.4 and G.992.3&5 regarding impulse noise protection, ITU—Telecommunication Standardization Sector, SBC, BellSouth, BT, Singapore, Jan. 19-Jan. 24, 2004, 4 pages.
Moulin et al., "Discrete-multitone-based ADSL and VDSL systems performance analysis in an impulse noise environment—Advances in Communication Cables Technology," IEE Proceedings, Nov. 3, 2003, vol. 150(6), pp. 273-278.
Sklower, K. et al. "The PPP Multilink Protocol (MP)" Network Working Group, Nov. 1994 (15 pages).
Toumpakaris et al., "A Simple Byte-Erasure Method for Improved Impulse Immunity in DSL," 2003 IEEE International Conference on Communications, May 2003, vol. 1 of 5, pp. 2426-2430.
Wolman, Alec et al. "Latency Analysis of TCP on an ATM Network" University of Washington, Printed Sep. 19, 2014 (14 pages).
Invitation to Pay Additional Fees for International (PCT) Patent Application No. PCT/US2005/006842, dated Jul. 28, 2005.
International Search Report for International (PCT) Patent Application No. PCT/US2005/006842, dated Oct. 5, 2005.
Written Opinion for International (PCT) Patent Application No. PCT/US2005/006842, dated Oct. 5, 2005.
International Preliminary Report on Patentability for International (PCT) Patent Application No. PCT/US2005/006842, dated Sep. 14, 2006.
Examiner's Report for Canadian Patent Application No. 2,555,757, dated Oct. 17, 2012.
Notice of Allowance for Canadian Patent Application No. 2,555,757, dated Jan. 17, 2014.
Office Action for Canadian Patent Application No. 2,555,757, dated Jun. 13, 2017.
First Office Action for Chinese Patent Application No. 200580006738.8, dated Oct. 23, 2009.
Second Office Action (including translation) for Chinese Patent Application No. 200580006738.8, dated Jun. 30, 2011.
Official Communication for European Patent Application No. 05724394.1, dated Aug. 19, 2010.
European Search Report for European Patent Application No. 10006702.4, dated Aug. 13, 2010.
Official Action for Indian Patent Application No. 2155/KOLNP/2006, dated Feb. 18, 2011.
Restriction Requirement for U.S. Appl. No. 10/597,482, dated May 7, 2009.
Official Action for U.S. Appl. No. 10/597,482, dated Jun. 30, 2009.
Official Action for U.S. Appl. No. 10/597,482, dated Dec. 2, 2009.
Official Action for U.S. Appl. No. 10/597,482, dated Jul. 19, 2010.
Official Action for U.S. Appl. No. 10/597,482, dated Feb. 9, 2011.
Official Action for U.S. Appl. No. 12/769,193, dated Sep. 22, 2010.
Official Action for U.S. Appl. No. 12/769,193, dated Apr. 19, 2011.
Official Action for U.S. Appl. No. 12/769,193, dated May 25, 2011.
Official Action for U.S. Appl. No. 12/769,193, dated Jan. 22, 2013.
Notice of Allowance for U.S. Appl. No. 12/769,193, dated Apr. 29, 2013.
Official Action for U.S. Appl. No. 13/914,852 dated Sep. 9, 2013.
Notice of Allowance for U.S. Appl. No. 13/914,852 dated Sep. 30, 2013.
Official Action for U.S. Appl. No. 14/075,077, dated Dec. 27, 2013.
Official Action (Ex Parte Quayle Action) for U.S. Appl. No. 14/075,077, dated Feb. 24, 2014.
Notice of Allowance for U.S. Appl. No. 14/075,077, dated Mar. 26, 2014.
Office Action for U.S. Appl. No. 14/285,911, dated Dec. 10, 2014.
Office Action for U.S. Appl. No. 14/285,911, dated Jun. 23, 2015.
Office Action for U.S. Appl. No. 14/757,630 dated Nov. 10, 2016.
Office Action for U.S. Appl. No. 14/757,630 dated Jun. 30, 2017.
Office Action for U.S. Appl. No. 14/757,630 dated Mar. 9, 2018.
Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Nov. 4, 2013-Oct. 19, 2015—Docket Nos. 1-122; (3,844 pages).

(56) References Cited

OTHER PUBLICATIONS

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Nov. 10, 2015-Jan. 5, 2016—Docket Nos. 123-129; (102 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Jan. 20, 2016-Feb. 2, 2016—Docket Nos. 131-137; (104 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Feb. 9, 2016-Mar. 2, 2016—Docket Nos. 138-157; (228 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Aug. 31, 2015 and Mar. 17, 2016-Apr. 22, 2016—Docket Nos. 108 and 180-208; (194 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Feb. 25, 2016, mailed publically available on May 25, 2016 Docket No. 155 (40 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Apr. 27, 2016-May 24, 2016; Docket Nos. 209-226; (813 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Mar. 6, 2016—made publically available Jun. 1, 2016 Docket Nos. 158; (61 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Jun. 3, 2016-Jun. 6, 2016; Docket Nos. 227-228; (67 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Jun. 27, 2016; Docket Nos. 229; (2 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Aug. 2-Sep. 14, 2016; Docket Nos. 230-236; (58 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Sep. 26, 2016; Docket Nos. 238-239; (19 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Oct. 26, 2016-Nov. 17, 2016; Docket Nos. 240-245; (37 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Sep. 18, 2016 and made available on Dec. 19, 2016 Docket No. 237; (36 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed From Dec. 9, 2016-Feb. 3, 2017; Docket Nos. 246-265; (688 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed made available on Dec. 19, 2016; Docket No. 237; (36 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Feb. 6, 2017 to May 1, 2017; Docket Nos. 266-286; (124 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Feb. 10, 2017, made available on May 11, 2017; Docket Nos. 269; (52 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from May 2, 2017 to Jul. 14, 2017; Docket Nos. 287-335; (1183 pages).

Documents filed with District Court Proceedings for *TQ Delta, LLC v. 2WIRE, Inc.*; U.S. District Court, for the District of Delaware (Wilmington); Civil Action No, 1:13-cv-01835-RGA; Includes documents filed from Jul. 24, 2017-Oct. 26, 2017; Docket Nos. 336-389; (3953 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed on Sep. 7, 2017 and made Publicly Available on Dec. 6, 2017; Docket No. 357; (156 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Oct. 27, 2017-Dec. 21, 2017; Docket Nos. 390-451; (1,411 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Feb. 1, 2018-Mar. 19, 2018; Docket Nos. 399, 430-431, and 453-504 (1,482 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made Publicly Available on Mar. 26, 2018; Docket No. 452; (120 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made Publicly Available on Apr. 16, 2018; Docket No. 463; (145 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made Publicly Available on May 9, 2018; Docket No. 487; (52 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Mar. 27, 2018-Jun. 11, 2018; Docket Nos. 505-530; (450 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made publicly available on Jul. 12, 2018; Docket No. 514; (63 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Jun. 11, 2018-Sep. 10, 2018; Docket Nos. 531-558; (133 pages).

Defendant 2WIRE, Inc.'s Preliminary Invalidity Contentions with Regard to Representative Asserted Claims for *TQ Delta, LLC v. 2WIRE, Inc.*—Including Claim Charts for Family 6 with Exhibits

(56) References Cited

OTHER PUBLICATIONS

L-1 to L-7; In the United States District Court for the District of Delaware; Civil Action No. 13-01835-RGA; filed Sep. 24, 2015 (215 pages).
Defendant 2WIRE, Inc.'s Invalidity Contentions in Response to TQ Delta's Dec. 8, 2016 Final Infringement Contentions for *TQ Delta, LLC v. 2WIRE, Inc.*—Including Claim Charts for Family 6 with Exhibits L-1 to L-8; In the United States District Court for the District of Delaware; Civil Action No. 13-01835-RGA; filed Jan. 23, 2017 (237 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Nov. 4, 2013-Nov. 30, 2015—Docket Nos. 1-100; (1722 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Dec. 16, 2015-Jan. 6, 2016—Docket Nos. 104-112; (193 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Jan. 20, 2016-Feb. 8, 2016—Docket Nos. 113-124; (252 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Feb. 9, 2016-Mar. 2, 2016—Docket Nos. 125-142; (225 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Mar. 17, 2016-Apr. 22, 2016; Docket Nos. 165-193; (152 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Feb. 25, 2016, made publically available May 25, 2016; Docket No. 140; (40 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Apr. 27, 2016-May 24, 2016; Docket Nos. 194-211; (813 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Mar. 3, 2016 made publically available Jun. 1, 2016; Docket Nos. 143; (61 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Jun. 3, 2016-Jun. 7, 2016; Docket Nos. 212-215; (138 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Jun. 27, 2016; Docket Nos. 216; (2 pages).
Documents filed with District Court Proceeding for *TQ Delta, LLC v. Zhone Technologies Inc.*; U.S. District Court, for the District of Delaware (Wilmington); Civil Action No. 1:13-cv-01836-RGA; Includes documents filed from Aug. 2-Aug. 23, 2016; Docket Nos. 217-219; (9 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed from Sep. 16, 2016; Docket Nos. 220; (2 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Sep. 26, 2016; Docket Nos. 221-222; (19 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Oct. 26, 2016-Nov. 17, 2016; Docket Nos. 223-227; (35 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Dec. 9, 2016-Feb. 3, 2017; Docket Nos. 228-236; (21 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Feb. 8, 2017 to Apr. 26, 2017; Docket Nos. 237-253; (118 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed on Feb. 10, 2017, made available on May 11, 2017; Docket Nos. 239; (52 pages).
Documents filed with District Court Porceedings for *TQ Delta, LLC v. Zhone Technologes Inc.*; U.S. District Court, for the District of Delaware (Wilmington); Civil Action No. 1:13-cv-01836-RGA; Included documents filed May 2, 2017 to Jul. 14, 2017; Docket Nos. 254-299; (1080 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Jul. 24, 2017-Oct. 25, 2017; Docket Nos. 300-352; (3668 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Sep. 7, 2017, made Publicly Available on Dec. 6, 2017; Docket No. 323; (156 pages).
Documents filed with District Court Proceedings for *TQ Delta, LLC v. Zhone Technologes Inc.*; U.S. District Court, for the District of Delaware (Wilmington); Civil Action No. 1:13-cv-01836-RGS; Includes documents filed Oct. 30, 2017-Dec. 5, 2017; Docket Nos. 353-375; (862 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents filed Feb. 1, 2018-Mar. 6, 2018; Docket Nos. 358, 376, and 377 (326 pages).
Documents filed with District Court Proceedings for *TQ Delta, LLC v. Zhone Technologies Inc.*; U.S. District Court, for the District of Delaware (Wilmington); Civil Action No. 1:13-cv-01836-RGA; Includes documents made Publicly Available on Mar. 26, 2018; Docket No. 378 (120 pages).
Defendant Zhone Technologies, Inc.'s Invalidity Contentions with Regard to Representative Asserted Claims for *TQ Delta, LLC v. Zhone Technologies, Inc.*—Including Claim Charts for Family 6 with Exhibits 114-119; In the United States District Court for the District of Delaware; Civil Action No. 13-01836-RGA; filed Sep. 25, 2015 (161 pages).
Defendant Zhone Technologies, Inc.'s Final Invalidity Contentions in Response to Plaintiff's Final Infringement Charts Regarding Non-Broadcom Products for *TQ Delta, LLC v. Zhone Technologies, Inc.*—Including Claim Charts for Family 6 with Exhibits 145-150; In the United States District Court for the District of Delaware; Civil Action No. 13-01836-RGA; filed Jan. 23, 2017 (147 pages).
Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2013-Nov. 30, 2015—Docket Nos. 1-117; (1996 pages).

(56) References Cited

OTHER PUBLICATIONS

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 16, 2015-Dec. 16, 2015—Docket Nos. 119; (48 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jan. 20, 2016-Feb. 8, 2016— Docket Nos. 125-139; (349 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Feb. 9, 2016-Mar. 2, 2016; Docket Nos. 140-157; (223 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Mar. 17, 2016-Apr. 22, 2016; Docket Nos. 180-208; (152 pages).

Documents filed with District Court Proceedings for *TQ Delta, LLC v. Zyxel Communications Inc, et al.*; U.S. District Court, for the District of Delaware (Wilmington); Civil Action No. 1:13-cv-02013-RGA; Includes documents filed on Feb. 25, 2016, made publically available May 25, 2016; Docket No. 155; (40 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Apr. 27, 2016-May 24, 2016; Docket Nos. 209-226; (809 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Mar. 3, 2016, made publically Jun. 1, 2016; Docket No. 158; (61 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 3, 2016-Jun. 13, 2016; Docket Nos. 227-232; (140 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 14, 2016; Docket Nos. 233; (2 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Jun. 27, 2016; Docket Nos. 235; (2 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Aug. 2, 2016-Sep. 1, 2016; Docket Nos. 236-239; (11 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed on Sep. 26, 2016; Docket Nos. 240-241; (19 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Oct. 26, 2016-Nov. 17, 2016; Docket Nos. 242-246; (35 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 9, 2016-Feb. 3, 2017; Docket Nos. 247-256; (23 pages).

Documents filed with District Court Proceedings for *TQ Delta, LLC v. Zyxel Communications Inc, et al.*; U.S. District Court, for the District of Delaware (Wilmington); Civil Action No. 1:13-cv-02013-RGA; Includes documents filed from Feb. 8, 2017-May 1, 2017; Docket Nos. 257-273; (69 pages).

Documents filed with District Court Proceedings for *TQ Delta, LLC v. Zyxel Communications Inc. et al.*; U.S. District Court, for the District of Delaware (Wilmington); Civil Action No. 1;13-cv-02013-RGA; Includes documents filed on Feb. 10, 2017, made available on May 11, 2017; Docket Nos. 259; (52 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from May 2, 2017-Jul. 14, 2017; Docket Nos. 274-320; (1080 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jul. 24, 2017-Oct. 25, 2017; Docket Nos. 321-372; (3670 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Sep. 7, 2017, made Publicly Available on December 6, 2017; Docket No. 342; (156 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Oct. 27, 2017-Dec. 21, 2017; Docket Nos. 373-434; (1,843 pages)

Documents filed with District Court Proceedings for *TQ Delta, LLC v. Zyxel Communications Inc. et al.*; U.S. District Court, for the District of Delware (Wilmington); Civil Action No. 1:13-cv-02013-RGA; Includes documents filed from Feb. 1, 2018-Mar. 19, 2018; Docket Nos. 378, 407-408; and 436-502; (4,366 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on Mar. 26, 2018; Docket No. 435; (120 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly on Apr. 16, 2018; Docket No. 454; (145 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on Apr. 17, 2018; Docket No. 454; (42 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly availabe on May 10, 2018; Docket No. 482; (52 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on May 14, 2018; Docket No. 485; (101 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Mar. 29, 2018-Jun. 8, 2018; Docket Nos. 503-534; (465 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents made publicly available on Jul. 12, 2018; Docket No. 513; (118 pages).

(56) References Cited

OTHER PUBLICATIONS

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Jun. 11, 2018-Sep. 10, 2018; Docket Nos. 535-580; (272 pages).
Defendant Zyxel's Initial Invalidity Contentions with Respect to Representative Asserted Claims for *TQ Delta, LLC v. Zyxel Communications, Inc. and Zyxel Communications Corporation*—Including Claim Charts for Family 6 with Exhibits F1-F6; In the United States District Court for the District of Delaware; Civil Action No. 13-02013-RGA filed Sep. 25, 2015 (151 pages).
Defendant Zyxel's Technologies, Inc.'s Final Invalidity Contentions in Response to Plaintiff's Dec. 8, 2016 Final Infringement Charts Regarding Non-Broadcom Products for *TQ Delta, LLC v. Zyxel Communications, Inc. and Zyxel Communications Corporation*—Including Claim Charts for Family 6 with Exhibits F1-F6; In the United States District Court for the District of Delaware; Civil Action No. 13-02013-RGA; filed Jan. 23, 2017 (171 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 17, 2014-Oct. 19, 2015—Docket Nos. 1-65; (2,489 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jan. 20, 2016-Feb. 8, 2016—Docket Nos. 67-68; (81 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 9, 2016-Mar. 1, 2016 Docket Nos. 69-72; (13 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 28, 2016-May 31, 2016—Docket Nos. 74-77; (8 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 8, 2016, made publicly available Jun. 6, 2016—Docket No. 73; (60 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 7, 2016-Jun. 8, 2016; Docket Nos. 78-80; (73 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jun. 15, 2016; Docket Nos. 81; (2 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed on Jun. 27, 2016; Docket Nos. 82; (2 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Aug. 2-Sep. 1, 2016; Docket Nos. 83-86; (11 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Nov. 4, 2016-Nov. 17, 2016; Docket Nos. 87-90; (11 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Dec. 9, 2016-Feb. 3, 2017; Docket Nos. 91-99; (19 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 8, 2017-May 1, 2017; Docket Nos. 100-118; (128 pages).
Documents filed with District Court Proceedings for *TQ Delta, LLC v. Adtran Inc.*; U.S. District Court, for the District of Delaware (Wilmington); Civil Action No. 1:14-cv-00954-RGA;Includes documents filed on Feb. 10, 2017, made available on May 11, 2017; Docket Nos. 102; (52 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from May 2, 2017-Jul. 14, 2017; Docket Nos. 119-167; (1087 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 21, 2017-Oct. 26, 2017; Docket Nos. 168-233; (4038 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Sep. 7, 2017, made Publicly Available on Dec. 6, 2017; Docket No. 197; (157 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Oct. 27, 2017-Dec. 21, 2017; Docket Nos. 234-290; (1664 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Feb. 1, 2018-Mar. 19, 2018; Docket Nos. 242; 266-267; and 292-359 (4,228 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Mar. 26, 2018; Docket No. 291 (120 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Apr. 16, 2018; Docket No. 310 (145 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on May 10, 2018; Docket No. 338 (52 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on May 14, 2018; Docket No. 342 (101 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Mar. 29, 2018-Jun. 7, 2018; Docket Nos. 360-419 (956 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Jul. 12, 2018; Docket Nos. 370-371 (181 pages).
Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 3, 2018-Sep. 10, 2018; Docket Nos. 420-491 (696 pages).

(56) References Cited

OTHER PUBLICATIONS

Defendant Adtran, Inc.'s Preliminary Invalidity Contentions with Regard to Representative Asserted Claims for *TQ Delta, LLC* v. *Adtran, Inc.*—Including Claim Charts for Family 6 as Exhibits 6-1-6-6; U.S. District Court, for the District of Delaware (Wilmington); Civil Action No. 1:14-cv-00954-RGA and Civil Action No. 1:15-cv-00121-RGA; filed Feb. 9, 2016 (167 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jul. 17, 2014-Mar. 1, 2016 Docket Nos. 1-77; (1,444) pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Mar. 28, 2016-May 31, 2016; Docket Nos. 79-82; (8 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents on Mar. 8, 2016 made publicly available Jun. 6, 2016; Docket Nos. 78; (60 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jun. 7, 2016-Jun. 8, 2016; Docket Nos. 83-85; (73 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jun. 15, 2016; Docket Nos. 86; (2 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed on Jun. 27, 2016; Docket Nos. 87; (2 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Aug. 2-Sep. 1, 2016; Docket Nos. 88-91; (11 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Nov. 4, 2016-Nov. 17, 2016; Docket Nos. 92-95; (11 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Dec. 9, 2016-Feb. 3, 2017; Docket Nos. 96-104 (19 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 8, 2017-May 1, 2017; Docket Nos. 105-122 (118 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed on Feb. 10, 2017, made available on May 11, 2017; Docket Nos. 107; (52 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from May 2, 2017-Jul. 14, 2017; Docket Nos. 122-169 (1083 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jul. 21, 2017-Oct. 26, 2017; Docket Nos. 170-235 (4150 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Sep. 7, 2017, made Publicly Available on Dec. 6, 2017; Docket No. 199; (157 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Oct. 27, 2017-Dec. 21, 2017; Docket Nos. 236-291 (1662 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Feb. 1, 2018-Mar. 19, 2018; Docket Nos. 242, 267-268, and 293-360 (4,228 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on Mar. 26, 2018; Docket No. 292 (120 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on Apr. 16, 2018; Docket No. 313 (145 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on May 10, 2018; Docket No. 341 (52 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly available on May 14, 2018; Docket No. 345 (101 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Mar. 29, 2018-Jun. 7, 2018; Docket Nos. 361-420 (956 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents made publicly on Jul. 12, 2018; Docket Nos. 371-372 (181 pages).
Documents filed with District Court Proceedings for *Adtran Inc.* v. *TQ Delta, LLC*; U.S. District Court, for the District of Delaware (Wilmington); Civil Action No. 1:15-cv-00121-RGA; Includes documents filed from Jun. 11, 2018-Sep. 10, 2018; Docket Nos. 421-490 (693 pages).
Documents filed with District Court Proceedings for *Adtran Inc.* vs. *TQ Delta, LLC*; U.S. District Court, for the Northern District of Alabama (Northeastern); Civil Action No. 5:14-cv-01381-JEO; Includes documents filed from Jul. 17, 2014-Jan. 27, 2015—Docket Nos. 1-32; (568 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents made publicly available on Oct. 25, 2018; Docket No. 543; (94 pages).
Documents filed with District Court Proceedings for *TQ Delta, LLC* v. *2WIRE, Inc.*; U.S. District Court, for the District of Delaware (Wilmington); Civil Action No. 1:13-cv-01835-RGA; Includes documents filed from Sep. 11, 2018-Nov. 21, 2018; Docket Nos. 559-580; (317 pages).
Documents filed with District Court Proceedings for *TQ Delta, LLC* v. *Zyxel Communications Inc. et al.*; U.S. District Court, for the District of Delaware (Wilmington); Civil Action No. 1:13-cv-02013-RGA: Includes documents made publicly available on Oct. 25, 2018; Docket No. 559; (94 pages).
Documents filed with District Court Proceedings for *TQ Delta, LLC* v. *Zyxel Communications Inc. et al.*; U.S. District Court, for the District of Delaware (Wilmington); Civil Action No. 1:13-cv-02013-

(56) References Cited

OTHER PUBLICATIONS

RGA; Includes documents filed from Sep. 18, 2018-Nov. 27, 2018; Docket Nos. 581-602; (302 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents made publicly available on Oct. 25, 2018; Docket No. 462 (94 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Sep. 18, 2018-Nov. 21, 2018; Docket Nos. 492-524 (486 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents made publicly available on Oct. 25, 2018; Docket No. 463 (94 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Sep. 18, 2018-Nov. 21, 2018; Docket Nos. 491-423 (486 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Dec. 10, 2018-Feb. 9, 2019; Docket Nos. 581-698; (5,536 pages).

Documents filed with District Court Proceedings for *TQ Delta, LLC v. Zyxel Communications Inc. et al.*; U.S. District Court, for the District of Delaware (Wilmington); Civil Action No. 1:13-cv-02013-RGA; Includes documents filed from Dec. 3, 2018-Feb. 6, 2019; Docket Nos. 603-617; (35 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Dec. 3, 2018-Feb. 6, 2019; Docket Nos. 525-553 (543 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Dec. 3, 2018-Feb. 6, 2019; Docket Nos. 524-552 (543 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made publicly available on Aug. 13, 2019; Docket Nos. 1148-1149; (138 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents filed from Jul. 19, 2019-Sep. 17, 2019; Docket Nos. 1228-1233 and 1238-1242; (177 pages).

Documents filed with District Court Proceedings for *TQ Delta, LLC v. Zyxel Communications Inc.* et al.: U.S. District Court, for the District of Delaware (Wilmington); Civil Action No. 1:13-cv-02013-RGA: Includes documents filed from Aug. 21, 2019-Oct. 2, 2019; Docket Nos. 634-638; (9 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Jul. 17, 2019-Sep. 27, 2019; Docket Nos. 658-838 (7239 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Sep. 30, 2019-Oct. 8, 2019; Docket Nos. 839-877 (344 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Jul. 17, 2019-Sep. 30, 2019; Docket Nos. 654-839 (7268 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Oct. 1, 2019-Oct. 8, 2019; Docket Nos. 840-874 (316 pages).

U.S. Appl. No. 16/448,939, filed June 21, 2019, Tzannes.

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made publicly available on Jun. 13, 2019; Docket No. 951; (19 pages).

Documents filed with District Court Proceedings for *TQ Delta, LLC v, 2WIRE, Inc.*; U.S. District Court, for the District of Delaware (Wilmington); Civil Action No. 1:13-cv-01835-RGA; includes documents filed from May 9, 2019-Jul. 15, 2019; Docket Nos. 1140-1227; (1076 pages).

Documents filed with District Court Proceedings for *TQ Delta, LLC v. Zyxel Communications Inc.* et al.; U.S. District Court, for the District of Delaware (Wilmington); Civil Action No. 1:13-cv-02013-RGA; Includes documents filed from May 16, 2019-Jul. 3, 2019; Docket Nos. 629-633; (11 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from May 10, 2019-Jul. 16, 2019; Docket Nos. 574-657 (1435 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from May 10, 2019-Jul. 16, 2019; Docket Nos. 572-653 (1433 pages).

Documents filed with District Court Proceedings for *TQ Delta, LLC v. 2WIRE, Inc.*; U.S. District Court, for the District of Delaware (Wilmington); Civil Action No. 1:13-cv-01835-RGA; Includes documents made publicly available on Nov. 4, 2019; Docket Nos. 1234-137; (890 pages).

Documents filed with District Court Proceedings for *TQ Delta. LLC v. 2WIRE, Inc.*; U.S. District Court, for the District of Delaware (Wilmington); Civil Action No. 1:13-cv-01835-RGA; Includes documents filed from Dec. 16, 2019-Dec. 20, 2019; Docket Nos. 1228-1233 and 1243-1246; (4 pages).

Documents filed with District Court Proceedings for *TQ Delta, LLC v. Zyxel Communications Inc.* et al.; U.S. District Court, for the District of Delaware (Wilmington); Civil Action No. 1:13-cv-02013-RGA; Includes documents filed from Oct. 9, 2019-Dec. 19, 2019; Docket Nos. 639-687; (2583 pages).

Documents filed with District Court Proceedings for *TQ Delta, LLC v. Adtran Inc.*; U.S. District Court, for the District of Delaware (Wilmington); Civil Action No. 1:14-cv-00954-RGA; Includes documents filed from Oct. 9, 2019-Dec. 20, 2019; Docket Nos. 878-930 (1152 pages).

Documents filed with District Court Proceedings for *Adtran Inc. v. TQ Delta, LLC*; U.S. District Court, for the District of Delaware (Wilmington); Civil Action No. 1:15-cv-00121-RGA; Includes documents filed from Oct. 9, 2019-Dec. 20, 2019; Docket Nos. 875-926 (1151 pages).

* cited by examiner

IMPULSE NOISE MANAGEMENT

RELATED APPLICATION DATA

This application is a Continuation of now abandoned U.S. application Ser. No. 14/757,630, filed Dec. 23, 2015, which is a Continuation of U.S. application Ser. No. 14/285,911, filed May 23, 2014, which is a Continuation of U.S. application Ser. No. 14/075,077, filed Nov. 8, 2013, now U.S. Pat. No. 8,743,932, which is a Continuation of U.S. application Ser. No. 13/914,852, filed Jun. 11, 2013, now U.S. Pat. No. 8,594,162, which is a Continuation of U.S. application Ser. No. 12/769,193 filed Apr. 28, 2010, now U.S. Pat. No. 8,462,835, which is a Continuation of U.S. application Ser. No. 10/597,482, filed Jul. 27, 2006, which is a national stage application under 35 U.S.C. 371 of PCT Application No. PCT/US2005/006842, filed Mar. 3, 2005, which claims the benefit of and priority under 35 U.S.C. § 119(e) to U.S. Provisional Application No. 60/549,804, entitled "On-Line Impulse Noise Protection (INP) Adaptation," filed Mar. 3, 2004, and U.S. Provisional Application No. 60/555,982, entitled "Impulse Noise Protection (INP) Training," filed Mar. 24, 2004, each of which are incorporated herein by reference in their entirety.

BACKGROUND

Field of the Invention

This invention generally relates to communication systems. In particular, an exemplary aspect of this invention relates to impulse noise protection adaptation. Another exemplary aspect of this invention relates to impulse noise length and period determination and use thereof for impulse noise protection adaptation.

Description of Related Art

Communications systems often operate in environments that produce impulse noise. Impulse noise is a short-term burst of noise that is higher than the normal noise that typically exists in a communication channel. For example, DSL systems operate on telephone lines and experience impulse noise from many external sources including telephones, AM radio, HAM radio, other DSL services on the same line or in the same bundle, other equipment in the home, etc. It is standard practice for communications systems to use interleaving in combination with Forward Error Correction (FEC) to correct the errors caused by impulse noise. Standard initialization procedures in ADSL and VDSL systems are designed to optimize performance (data rate/reach) in the presence "stationary" crosstalk or noise. Impulse noise protection is handled with interleaving and FEC, but the current xDSL procedure at least does not provide specific states to enable training for the selection of the appropriate interleaving and FEC parameters.

An exemplary problem associated with traditional communication systems is that they use traditional Signal to Noise Ratio (SNR) measurement techniques to determine the SNR of the channel. These traditional techniques assume that the noise is stationary and does not contain non-stationary components such as impulse noise. The most common method for measuring the SNR is to calculate the mean-square error of the received signal based on a known transmitted signal, which is described in the ADSL series of ITU G.992.x standards and the VDSL series of ITU G.993.x standards, which are incorporated herein by reference in their entirety. These traditional methods for measuring SNR do not correctly measure the impact of impulse noise and do not have the noise capability to determine how the system should be configured to handle impulse noise.

There has been proposed that there is a need in ADSL and VDSL systems to provide robust error-free performance in the presence of high, real-world impulse noise. A specific proposal recommends that the standard impulse noise protection (INP) values are extended to values of 4, 8, 16 and 32 in order to handle high levels of impulse noise. Impulse noise protection is defined in the ADSL2 Standard G.992.3, which is incorporated herein by reference in its entirety, as the number of impulse noise corrupted DMT symbols that can be corrected by the FEC and interleaving configuration. Specifically, G.992.3 defines the following variables:

$$INP=\frac{1}{2}*(S*D)*R/N$$

$$S=8*N/L$$

$$\text{Latency(or delay)}=S*D/4$$

$$\text{Line Rate(in kbps)}=L*4$$

where N is the codeword size in bytes, R is the number of parity (or redundancy) bytes in a codeword, D is the interleaver depth in number of codewords, and L is the number of bits in a DMT symbol.

If K is the number of information bytes in a codeword then:

$$N=K+R$$

and the user data rate is approximately equal to:

$$L*4*K/N.$$

In general, DSL systems (such as the one defined in ADSL G.992.x or VDSL G.993.x) use the FEC and Interleaving Parameters (FIP) characterized by the set of parameters (N, K, R, D). Using these parameters, the Burst Error Correction Capability (BECC) in bytes can be simply calculated as:

$$BECC=D*R/2 \text{ bytes}$$

where BECC is defined as the number of consecutive byte errors that can be corrected by the receiver. Note that if the receiver uses more intelligent decoding schemes, such as erasure detection, it is possible to correct even more than D*R/2 bytes. It also follows from above that INP=BECC/L.

The proposal further recommends that the higher INP values are achieved by increasing the amount of FEC redundancy while keeping the same system latency and the same interleaver memory at the expense of user data rate or excess margin. Since, on phone lines without excess margin, there is clearly a trade-off between high impulse noise protection values and user data rate, it would be advantageous to try to maximize the user data rate by finding the minimum impulse noise protection value that can provide adequate impulse noise protection. The current technique includes the steps of an operator, or service provider, configuring the ADSL connection with a specific noise protection value, the ADSL connection is initialized and the transceivers enter into steady state data transmission (i.e., Showtime), and if the connection is stable, i.e., error-free, then the service is acceptable and the process ends. If there are bit errors, then the process is repeated with the operator, or service provider, configuring the ADSL connection with another specific INP value.

One exemplary problem with this approach is that it is time consuming and can result in sub-optimum user rates. This is illustrated with reference to the following examples:

Example 1: Assume that for a particular DSL connection there is high impulse noise and the required INP is 8. As a result, if the service provider uses a first INP configuration of 2, the DSL connection will not be error free. Therefore, the service provider needs to configure a higher INP value and reinitialize the connection. If a value of 4 is used as a second INP value, it still will not provide adequate impulse noise protection and bit errors will occur. Again, the service provider will need to configure a higher INP value until the correct value of 8 is configured. Clearly, the connection needs to be re-initialized every time there is a new INP configuration chosen and this trial and error technique proves to be very time consuming.

Example 2: Assume that for a particular DSL connection there is high-impulse noise and the required INP is 4. As a result, if the service provider uses a first INP configuration of 2, the connection will not be error free. Therefore, the service provider needs to configure a higher INP value and reinitialize the connection. In order to save time and not go through the number of initializations has occurred in Example 1, the service provider simply configures the system to the maximum INP value of 32. Obviously, there will be no bit errors with INP=32 since this connection needs only an INP value of 4. As a result, user data throughput is greatly degraded since the additional FEC redundancy will be three times higher than what is actually needed. For example, if the INP of 4 requires 10 percent FEC redundancy, an INP of 32 requires 40 percent FEC redundancy which results in a 30 percent decrease in user data rate.

SUMMARY

In additional to the above drawbacks, the related systems do not have the ability to actually measure the length or repetition period of impulse noise which can both be used to determine an appropriate impulse noise protection setting.

Exemplary aspects of this invention relate to determining the impact of impulse noise on a communication system and the capability to determine how the system should be configured to handle the impulse noise event.

An exemplary aspect of this invention determines the impact of impulse noise by transmitting and receiving using a plurality of different FEC and interleaving parameter settings. For each FEC and Interleaving Parameter (FIP) setting, the received signal quality is determined by, for example, detecting if there are bit errors after the receiver performs the FEC decoding and deinterleaving. Based on this, the appropriate FIP setting is selected and used for transmission and reception.

A plurality of FIP settings can be used for transmission and reception. In accordance with one particular aspect of this invention, the system can transition from one FIP setting to another FIP setting without going through the startup initialization procedure such as the startup initialization sequence utilized in traditional xDSL systems. For example, an xDSL system that implements the systems and methods described herein could start using an FIP setting of (N=255, K=247, R=8, D=64) and then transition to an FIP setting of (N=255, K=239, R=16, D=64) without re-executing the startup initialization procedure.

Knowing that the first FIP setting has a BECC=256 bytes and the second setting has a BECC=512 bytes, means, for example, that the second setting can correct an impulse that causes twice as many bit errors as the first FIP setting. On the other hand, the first FIP setting has less FEC parity (overhead) which results in a higher information (net) data rate for the user during Showtime. This is also illustrated by the fact that K, the number of information bytes per code word, is higher for the first FIP setting. For each of the FIP settings, the receiver detects whether there are bit errors after the decoding and deinterleaving process. This detection can be done by, for example, by performing a cyclic redundancy check (CRC) after the decoding and deinterleaving process is complete as defined in the ITU standard G.992.x. In general, the CRC is a well-known method for detecting bit errors. Since impulse noise occurs at random times, this system can operate using a particular FIP setting for a period of time that is sufficient to encounter the impulse noise. In the simple example illustrated above, only the K and R values were modified. It should be appreciated however, that the systems and methods of this invention are not limited thereto but rather can be extended to include the modification of any one or more FIP parameter(s).

The process of determining the impact of impulse noise by transmitting and receiving using a plurality of FIP settings can be done while in steady-state transmission, i.e., Showtime for DSL systems, when user information bits are being transmitted.

The process of determining the impact of impulse noise by transmitting and receiving using a plurality of FIP settings, can be done during a special impulse noise training period during which the system is not actually transmitting user data. In accordance with this exemplary aspect of the invention, the standard xDSL procedure is modified to include the capability of measuring the effectiveness of a chosen impulse noise protection (INP) setting during initialization and having receiver-controlled updates of transmission parameters that control the INP setting, e.g., FEC parameters and interleaving parameters, during initialization.

A new initialization state is included in the xDSL initialization procedure that provides the capability to measure the effectiveness of the current INP settings. The new initialization state will be referred to as the INPTraining state and it can, for example, follow the exchange of the Showtime transmission parameters such as the bi/gi table, trellis coding, tone reordering, FEC/interleaving parameters, etc. It is important to note that steady-state transmission during which user information is transmitted is known as "Showtime" in XDSL systems and that standard ITU G.992.3 ADSL systems and ITU VDSL G.993.3 systems include an exchange phase in initialization during which the Showtime parameters are exchanged, see, for example, G.992.3 and G.993.1.

During this INPTraining state, the transceivers transmit and receive using at least one of the standard Showtime functions using the Showtime parameters, e.g., bi/gi table, FEC/interleaving parameters, etc., that are exchanged during the previous exchange phase. These functions include at least one of Showtime PMD functions, e.g., bi/gi table, trellis coding, tone reordering, etc., PMS-TC functions, such as framing and FEC/interleaving, and TPS-TC functions. During the INPTraining state, the TPS-TC can transmit idle ATM cells, HDLC flags, or 64/65 idle packets depending on the TPS-TC type.

At the receiver, the CRC, the FEC, the TPS-TC error detection capabilities, and other receiver functions can be used to determine whether the INP setting is adequate for the current impulse noise conditions on the line. The receiver can also use these receiver functions to automatically and dynamically determine what the correct INP setting should be. If the current INP setting is not adequate, a new set of Showtime transmission parameters can be exchanged and the process repeated by reentering the INPTraining state using the newly exchanged Showtime transmission parameters. If, on the other hand, the current INP setting is adequate, the transceivers can enter into Showtime.

An exemplary advantage associated with this aspect of the invention is that the receiver can measure the effectiveness of the current INP setting and can make updates to the INP setting based on these measurements during initialization. This is important because the receiver generally has the most knowledge of channel conditions, receiver functionality, and processing capability. In general, the receiver has the best capability to make the necessary trade offs between data rate, latency, excess margin, FEC redundancy, coding gain, and the like. Current related ADSL systems have the operator servicing lines that are experiencing high impulse noise by trying various INP settings in an attempt to find an error-free operating mode. However, since the operator is not capable of making the receiver trade offs stated above, such as the data rate, latency, and the like, the process will often lead to a sub-optimum result.

Another exemplary aspect of this invention relates to determining the length and/or repetition period of impulse noise events in order to select an appropriate INP setting.

For example, the transceivers can transmit and receive using at least one of the standard Showtime functions and parameters such as the bi/gi table, FEC/interleaving parameters, and the like. These functions include the Showtime PMD functions, such as the bi/gi table, trellis coding, tone reordering and the like, PMS-TC functions (such as framing and FEC interleaving) and TPS-TC functions. The TPS-TC may transmit ATM cells, HDLC packets, or 64/65 packets depending on, for example, the TPS-TC type.

At the receiver, the CRC, the FEC, the TPS-TC error detection capabilities, and other receiver functions can be used to determine the length and the period of the impulse noise and whether an INP setting is adequate for the current impulse noise conditions on the line.

For example, the receiver can determine the length of an impulse noise event. The length of impulse noise events can be determined in a number of ways. For example, they can be determined as:

1. The length of the impulse in time, e.g., how many microseconds the impulse power is above a specific noise level (e.g. the above the stationary channel noise)
2. The number received bits that are affected by the impulse noise, e.g. how many received bits are in error in a specific sliding time window or how many consecutive bits are in error in a stream
3. The number of received ATM cells that are affected by the impulse noise, e.g. how many ATM cells contain bits that are in error. This may be detected using a standard ATM HEC, which is a CRC that covers the ATM header bits. Alternatively this may detected by checking the ATM payload bits by, for example, transmitting a predefined bit pattern that is known by the receiver
4. The number of 64/65 packets that are affected by the impulse noise, e.g. how many packets contain bits that are in error (the 64/65 CRC can be used for this)
5. The number of received DMT symbols that are affected by the impulse noise, e.g., the measured noise in a DMT symbol is above a predefined threshold which results in most (if not all) the bits in that DMT symbol being in error
6. The number of FEC codewords that are affected by the impulse noise, e.g., how many codewords have an uncorrectable number of bit errors, i.e., the number of bit errors in a codeword exceeds the number of bit that are correctable by the FEC code In accordance with one exemplary aspect, the FEC correction capability and interleaving is turned off when trying to determine the length of the impulse noise. For example, the FEC may be configured so that there are no parity bits (i.e., R=0) or the FEC may be disabled altogether (i.e., no codewords are sent). Additionally, for example, the interleaving may be disabled by setting the interleaver depth to 1 (i.e., D=1). Disabling the FEC and interleaving is beneficial when trying to determine the length of the impulse noise based on affected bits, affected code words and/or affected packets. This is true since when the FEC/interleaving is enabled, the impulse noise event will be spread over a large time period and it will be more difficult to determine the length of the original impulse.

The exemplary techniques discussed herein that are used to determine the length of the impulse event can also be extended to determining the repetition period of the impulse noise event, i.e., how often is impulse noise occurring. The repetition period can be important, because the period has an effect on the FIP setting that is used. For example, if the interleaving spreads an impulse noise event over a period of time that exceeds the impulse period, then the interleaver could combine multiple impulse noise events together. As a result, the FEC correction capability may have to be increased. In order to determine the repetition period of an impulse noise event, the receiver can first detect the impulse noise event as discussed above and then determine how often the impulse noise events occur. For example, periodic impulse noise due to AC power lines occurs at a 120 Hz reception rate, or approximately every 8 ms.

In the case where the impulse noise does not have a fixed length, i.e., where the impulse noise varies over time, the receiver can attempt to determine the maximum impulse noise length. This involves measuring several impulse noise events and determining the impulse noise event with the maximum length. In practice, it is likely that the impulse noise will have varying length and it is important that the FEC/interleaving settings be configured to handle the maximum, e.g., worst case, impulse noise event.

Once the receiver determines the (maximum) length of the impulse noise and/or the repetition period of the impulse noise, this information can be sent to the transmitting modem. In particular, when the receiving modem, such as a Customer-Premises (CPE) modem determines the (maximum) length of the impulse and/or the repetition period of the impulse, the CPE modem could send the information to a Central Office (CO) modem in a message. The length of the impulse length event can be defined and specified in the message in terms of time, received bits, ATM cells, 64/65 packets, DMT symbols, or the like. The CO modem could then, for example, provide this information to the CO-MIB, which is the management interface that is used by the operator or service provider to configure the modems. For example, based on this information, the operator may configure the modems to a different INP value, data rate, latency, or the like. This process could also be automated such that the message received by the CO modem allows automatic reconfiguration to adjust, for example, INP values, data rate, latency, or the like.

The exemplary aspects of the invention that are used to determine the length and/or repetition period of the impulse noise event can be performed during initialization and/or Showtime. During initialization, the method can perform during an INPTraining state such as the one described herein. During Showtime the method can be performed, for example, during a Showtime INP adaptation phase as described herein.

These and other features and advantages of this invention are described in, or are apparent from, the following description of the embodiments.

BRIEF DESCRIPTION OF THE DRAWINGS

The features of this invention will be described in relation to the figures, wherein.

DETAILED DESCRIPTION

Figure 1:
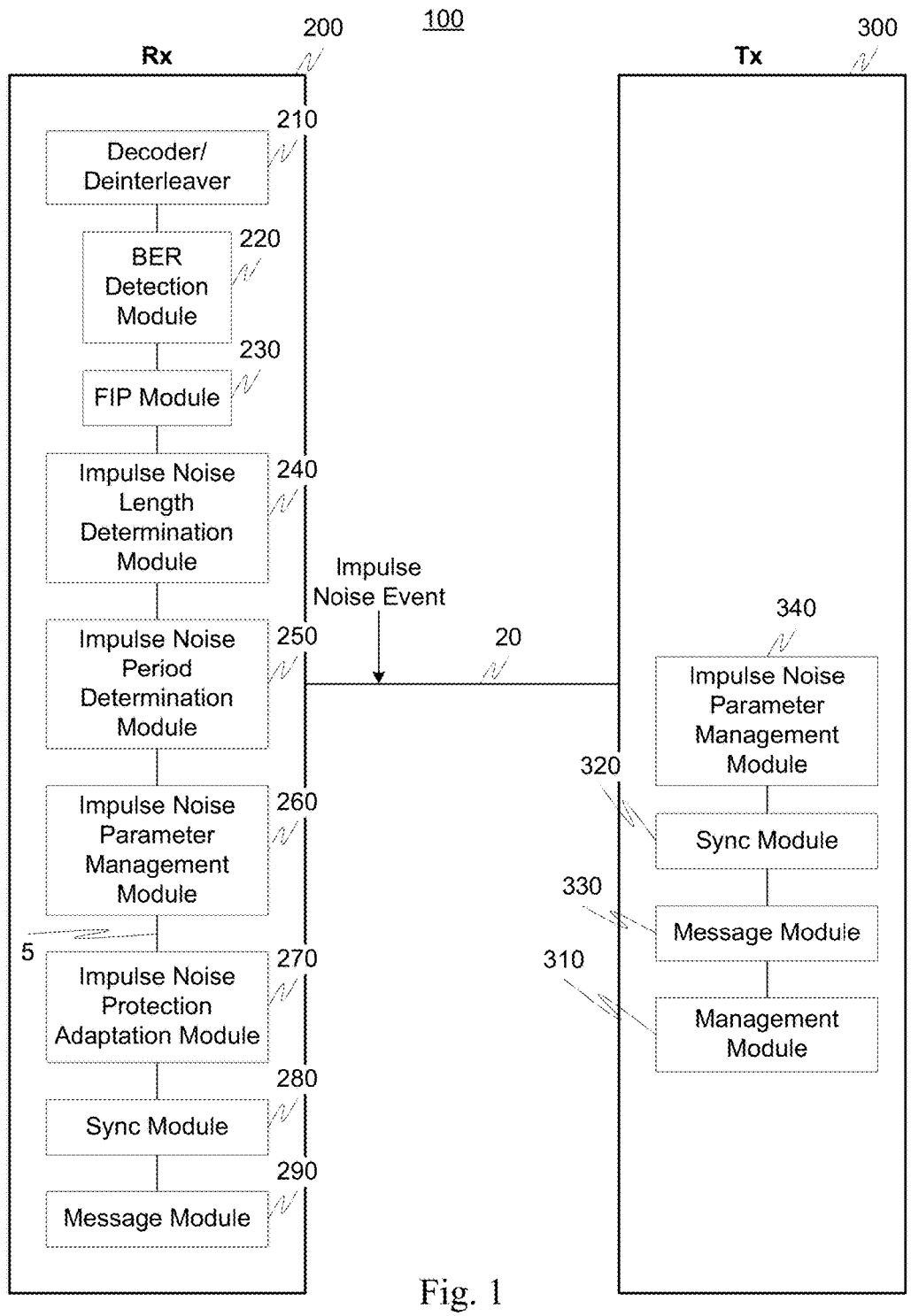
FIG. 1 is a functional block diagram illustrating an exemplary impulse noise adaptation system according to this invention.

The exemplary embodiments of this invention will be described in relation to adapting impulse noise parameters as well as measuring impulse noise length and repetition period within an xDSL environment. However, it should be appreciated that, in general, the systems and methods of this invention can be applied and will work equally well with any type of communication system in any environment.

The exemplary systems and methods of this invention will be described in relation to xDSL modems and associated communication hardware, software, and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however, that the present invention may be practiced in a variety of ways beyond the specific details set forth herein. For example, the systems and methods of this invention can generally be applied to any type of system within any environment in which the impulse noise length and/or period is desired, or for which impulse noise adaptation is desired.

Furthermore, while the exemplary embodiments illustrated herein show the various components of the system collocated in specific locations, it is to be appreciated that the various components of the system can be located or relocated at distant portions of a distributed network, such as a telecommunications network and/or the Internet, or within a dedicated secure, unsecured and/or encrypted system. Thus, it should be appreciated that the components of the system can be combined into one or more devices, such as a modem, or collocated on a particular node of a distributed network, such as a telecommunications network. As will be appreciated from the following description, and for reasons of computational efficiency, the components of the system can be arranged at any location within a distributed network without effecting the operation of the system. For example, the various components can be located in a central office (CO or ATU-C) modem, a customer premises modem (CPE or ATU-R), or some combination thereof. Similarly, the functionality of the system could be distributed between one or more of the modems and an associated computing device.

Furthermore, it should be appreciated that the various links, including communications link 20, connecting the elements can be wired or wireless links, or any combination thereof or any other known or later-developed element(s) that is capable of supplying and/or communicating data to and from the connected elements. The term module as used herein can refer to any known or later-developed hardware, software, or combination of hardware and software that is capable of performing the functionality associated with that element. Furthermore, as used herein, the term "transmitter" has the same meaning as the term "transmitting modem" or "transmitting transceiver" and the term "receiver" has the same meaning as "receiving modem" or "receiving transceiver."

FIG. 1 illustrates an exemplary embodiment of an impulse noise adaptation system 100 according to an exemplary embodiment of this invention. In particular, the system 100 comprises a receiving modem 200 and a transmitting modem 300. The exemplary receiving modem 200 comprises a decoder/deinterleaver 210, a bit error rate (BER) detection module 220, a forward error correction and interleaving parameter (FIP) module 230, an impulse noise length determination module 240, an impulse noise period determination module 250, an impulse noise parameter management module 260, an impulse noise protection adaptation module 270, a synchronization module 280, a message module 290 and a controller and memory (not shown) all interconnected by a link 5. The exemplary transmitting modem 300 comprises a management module 310, a synchronization module 320, a message module 330, and may optionally include an impulse noise parameter management module 340.

In operation, the exemplary communication system adapts the impulse noise parameters on-line by operating using a series of different FIP settings. For each FIP setting, the system can dynamically determine if the appropriate amount of impulse noise protection is being provided. Based on these determinations, the system can select a particular FIP setting for regular, i.e., Showtime, operation. As will be discussed in greater detail hereinafter, this impulse noise protection adaptation can be performed during Showtime and/or during initialization.

Impulse noise protection adaptation during Showtime includes the following exemplary steps. First, the DSL system, i.e., the transmitting and receiving modems, completes regular initialization and commences transmission and reception using a first FIP setting. For DSL systems, this first FIP setting is selected by the receiver 200 and is based on the minimum/maximum data rate, maximum latency, and minimum INP parameters as configured by, for example, the service provider via the management module 310. A detailed explanation of this procedure can be seen in G.992.3.

The system will use this first FIP setting for a period of time T1. During this period, and in conjunction with the BER detection module 220, the receiver 200 detects if bit errors have occurred using this first FIP setting for the decoding and deinterleaving performed by the decoder/ deinterleaver 210. For example, the receiver 200 can use a CRC to detect bit errors. If there are no bit errors, then the current INP setting is adequate and there is no need to modify the INP setting and Showtime communication can continue as normal.

However, if bit errors have been detected by the BER detection module 220, an adjustment to the INP setting may be appropriate. For example, a service provider, a user, or the system can choose an updated INP setting. Since bit errors have been detected, the INP setting could be increased by an on-line modification to the FIP parameters. Specifically, the transmitter 300, and for example the management module 310, in response to an indication from the receiver 200 that bit errors have been detected, can send a message to the receiver 200 to initiate a change in the INP settings. The receiver 200, in cooperation with the message module 290, the FIP module 230, the impulse noise parameter management module 260 and impulse noise protection adaptation module 270, can return a message to the transmitter 300 that specifies a newly determined FIP setting that satisfies the new INP requirement.

The transmitter 300 and receiver 200 can then transition to the new INP setting by starting to use the new FIP parameters for transmission and reception, respectively, at a synchronized point in time. This synchronization can be done in accordance with a number of exemplary methods that are discussed hereinafter.

Upon synchronization, the system 100 continues communication using the updated FIP settings for a second period of time T2. If the receiver detects that bit errors are occurring using this updated FIP setting during the decoding and deinterleaving performed by the decoder/deinterleaver 210 the steps can be repeated with the selection of another updated INP setting. However, if there are no bit errors detected by the receiver 200 during the time period T2, then the new INP setting is adequate and there is no need for further change at which point the INP adaptation procedure can end.

This Showtime-based INP adaptation process can be repeated as many times as necessary until an INP setting is obtained that provides the required impulse noise immunity and/or bit error rate.

One advantage of this technique is that the transition between different FIP settings can be accomplished without reinitializing the transceivers using the lengthy standard initialization procedure that is typically used in ADSL and VDSL systems. In contrast, the transition can occur without the standard initialization since the transition between FIP settings can be synchronized between the transmitter and the receiver such that the receiver 200 can determine when to start FEC decoding using the new FIP settings for K and R. As will be discussed hereinafter, this transition can be synchronized using a number of different exemplary methods.

The transition can also be accomplished without synchronization in which case the receiver 200 will determine when the new FIP settings are used by some alternative means. For example, the receiver could determine when the new FIP settings are being used by FEC decoding using both the old and updated FIP settings and determining which one is currently being utilized by the transmitter by determining with which FIP setting the codeword is correct. Other receiver functions such as CRCs, ATM HEC errors and the like could also be used.

This impulse noise protection adaptation procedure can be performed during regular steady-state transmission, i.e., Showtime in ADSL, using actual user data or, for example, idle ATM cells. This methodology can also be performed during a special impulse noise training period during which the system is not actually transmitting user data. For example, this impulse noise training period could utilize transmitted predefined pseudorandom bit streams or, for example, idle ATM cells or HDLC flags for determining an appropriate INP value.

The length of the time periods T1, T2, . . . can be controlled by, for example, the receiving modem 200. The receiving modem 200 could control the length of these time periods by, for example, sending a message that specifies how long the transmitter should transmit using a particular FIP setting. This length can be defined, for example, in terms of the number of DMT symbols or the number of FEC codewords. For example, a message could indicate that 200 DMT symbols should be sent for all FIP settings or 300 FEC code words should be sent for all FIP settings. Alternately, the message can indicate a different number of DMT symbols or FEC code words for each FIP setting. This technique could further be used to aid in determining an appropriate INP setting by forwarding a predetermined number of DMT symbols at a first FIP value, followed by a second number of DMT symbols at a second FIP value, and so on. For each of these sets of DMT symbols and associated FIP values, the receiver could determine the bit error rate, with the cooperation of the BER detection module 220, and then forward a message, with the cooperation of the message module 290, to the transmitter 300 specifying which FIP setting provided the appropriate impulse noise protection.

Similarly, the transmitting modem 300 and receiving modem 200 could cooperate such that an optimum impulse noise protection value is converged upon. For example, the transmitting modem 300, with the cooperation of the message module 330, could forward a message to the receiving modem 200 specifying a first INP setting. If there are no bit errors, a message could be sent via the message module 290 to the transmitting modem 300 indicating that there are no bit errors and a lower INP value could be attempted. The impulse noise parameter management module 260 and FIP module 230 could then determine an appropriate lower INP setting and forward it to the transmitter 300. As discussed above, since a lower INP value is inversely proportional to the user data rate, it is advantageous to optimize the INP value based on detected errors. The transmitting modem 300, in cooperation with the message module 330, could then send another message to the receiving modem 200 indicating that the lower INP value will be transitioned to at which point the procedure repeats itself through detection of bit errors in cooperation with the bit error rate detection module 220 and the decoder/deinterleaver 210. This reduction in the INP parameters can continue until bit errors are detected at which point a message is sent, with the cooperation of the message module 290, to the transmitting modem 300 indicating a higher INP value is required since bit errors were detected. Then, for example, based on an evaluation of a convergence of bit errors vs. impulse noise protection parameters, an optimum INP value can be determined and transitioned to by the receiver 300 and transmitter 200. This procedure could also be used to increase the INP parameters in a similar fashion.

The length of the time periods T1, T2, . . . can also be controlled by the transmitter 300. For example, the transmitter 300 could control the length of these time periods, by, for example, sending a message to the receiver 200 that specifies the length of time the transmitter will transmit using a particular FIP setting. This length could be defined in terms of the number of DMT symbols or, for example, the number of FEC codewords. The exemplary message could indicate that, for example, 200 DMT symbols would be sent for all FIP settings or 300 FEC codewords will be sent for all FIP settings. The message could also indicate a different number of DMT symbols or FEC codewords for each FIP setting. In general, the message could contain any type of information relating to how long the transmitter will be using a specific FIP setting(s).

The length of the time periods T1, T2 . . . can also be controlled by, for example, a service provider or a user. For example, the service provider could configure through the management module 310 a minimum time X=10 seconds to be used for testing each FIP setting. The service provider could use the knowledge of the nature of the impulse noise, such as how often impulse noise event occurs, to determine the times. However, and in general, the length of the time periods could be configured to be any length of time as appropriate.

As discussed above, when a determination is made that there are bit errors and an increase in the INP setting is desirable, the receiving modem 200 can determine the new INP settings. However, it should be appreciated that the transmitting modem 300, in cooperation with the impulse noise parameter management module 340 could also determine updated INP settings. For example, either modem could continually adapt the INP values as discussed above until no bit errors that are the result of impulse noise are detected by the BER detection module 220.

As alluded to above, the receiver and transmitter can synchronize the modification of the FEC and interleaving parameters such that the both the transmitter and receiver start using the parameters at the same instant in time. This synchronization can be based on, for example, a synchronization using FEC codeword counters or a flag signal.

For synchronization using FEC codeword counters, the receiver 200 and transmitter 300 can synchronize the change in cooperation with the sync modules 280 and 320, by counting the FEC codewords from the beginning of Showtime and the transition would occur when a specific FEC codeword counter value that is known by both the transmitter 300 and the receiver 200 is reached. Prior to the transition point, the transmitter 300 or receiver 200 in cooperation with the message module 290 and message module 330, would send a message indicating the FEC codeword count value on which the FIP parameters will be updated. For example, the transmitting modem 300 can enter into Showtime and the synchronization module 320 commences counting the number of transmitted FEC codewords. For example, the first codeword transmitted has a count value of 0, the second transmitted codeword has a count value of 1 . . . . The counter can optionally be defined as having a finite length, for example, 0 to 1023 (10 bits) such that when the value of 1023 is reached, on the next FEC code word that is transmitted, the counter restarts at the value of 0.

Similarly, the receiving modem 200 upon entering Showtime starts a counter in cooperation with the synchronization module 280 that counts the number of received FEC codewords. The first received FEC codeword has a count value of 0, the second received FEC codeword to the count value of 1 . . . . As with the synchronization module 320, the synchronization module 280 can have a counter with a finite length, for example 0-1023, such that when the value of 1023 is reached, on the next FEC codeword the counter restarts at 0.

At some point, for example, based on detected bit errors, the user, a service provider, or the like, it is determined that an updated FIP setting is needed. The receiving modem 200 can send a message, via the message module 290, to the transmitting modem 300, and in particular the message module 330 and impulse noise parameter management module 340. The updated FIP setting can alternatively be sent from the transmitting modem to the receiving modem.

The synchronization module 280 and message module 290 then cooperate to send a message to the transmitting modem 300 specifying the FEC codeword counter value on which the new FIP settings are to be used for transmission and reception. Alternatively, the transmitting modem, in cooperation with the message module 330, can send a message to the receiving modem indicating the FEC codeword counter value on which the FIP settings are to be used for transmission and reception. For example, the message can indicate that when the code word counter equals 501, the new FIP setting will be used for transmission and reception.

When the transmitter FEC codeword counter equals the value indicated in the message, the synchronization module 220 instructs the transmitting modem 300 to transition to the new FIP settings. Similarly, when the synchronization module 280 in the receiving modem 200 counts the FEC codeword that equals the value indicated in the message, the receiving modem 200 transitions to using the new FIP settings for reception.

Synchronization can also be performed through the use of a flag signal (sync flag). For this exemplary embodiment, the receiving modem 200 and transmitting modem 300, in cooperation with the synchronization module 280 and synchronization module 320, synchronize the change in FIP settings using a flag or marker signal that is similar to that used in the ADSL2 G.992.3 ORL protocol. This protocol may be more desirable than using an FEC codeword counter because, for example, it has greater impulse noise immunity.

For synchronization using a flag signal, the receiver and transmitter would start using updated FEC and interleaving parameters on a pre-defined FEC codeword boundary following the sync flag. For example, while transmitting using a first INP setting, a determination is made by, for example, the BER detection module 220 that a new FIP setting is needed due to the presence of impulse noise on the line. This determination can be performed by the receiving modem, in cooperation with the FIP module 230, the transmitting modem, a user, a service provider, or the like. The receiving modem 200, in cooperation with the message module 290, sends a message to the transmitting modem 300 indicating the new FIP settings to be used for transmission and reception. Alternatively, the transmitting modem, in cooperation with the message module 330, prepares and sends a message to the receiving modem indicating the updated FIP settings to be used for transmission and reception.

The transmitting modem then sends a flag or marker signal to the receiving modem 200 indicating that the new FIP settings are to be used on a predetermined number of DMT symbols following the transmission of the flag or marker signal. For example, the flag signal could be an inverted sync symbol, or sync FLAG, as used in the ADSL2 G.992.3 OLR protocol. The transmitting modem 300 then starts using the new FIP settings for transmission on the predetermined number of DMT symbols following the transmission of the flag or marker signal. Similarly, the receiving modem starts using the new FIP settings for reception once the predetermined number of DMT symbols following the receipt of the flag or marker signal have been received.

EXAMPLE 1

On-Line INP Adaptation FIP Setting

This section describes an example of FIP settings for On-Line INP adaptation for DSL. In this example only the number of information bytes in a codeword (K) and the number of parity bytes in a codeword (R) are updated on-line. The Codeword Size (N) and Interleaver Depth (D) are not changed. This means that the latency (and interleaver memory size) and the line rate are not modified on-line. Since N=K+R this places restrictions on the allowed values for K and R.

1st Setting—{Approximate User Data Rate=3.968 Mbps, Line Rate=4.096 Mbps, N=128, K=124, R=4, S=1, D=64, Latency=16 msec, INP=1}
2nd Setting—{Approximate User Data Rate=3.840 Mbps, Line Rate=4.096 Mbps, N=128, K=120, R=8, S=1, D=64, Latency=16 msec, INP=2}
3nd Setting—{Approximate User Data Rate=3.584 Mbps, Line Rate=4.096 Mbps, N=128, K=112, R=16, S=1, D=64, Latency=16 msec, INP=4}

The On-line INP adaptation process is restricted to only modify the number of information bytes in a codeword (K) and the number of parity bytes in a codeword (R). The FEC Codeword Size (N=K+R) and Interleaver Depth (D) are not changed. This means that the latency (or interleaver memory size) and the line rate are not modified on-line. However the user data rate will change during the process since K is being modified. Also since the line rate and the FEC codeword size are not modified, the S value does not change in the process. It is important to note that with these constraints, the On-line INP adaptation process can be done in as seamless manner (no bit errors and service interruption). This means provided that the modification if the FIP setting is restricted to K and R, the transition between FIP settings can be done in a seamless manner. This is the case because if the codeword size N and the interleaver depth D are not modified, the transition can happen without the problem of "interleaving memory flushing." Interleaver memory flushing is a well-known problem in which errors occur because interleaver and deinterleaver memory locations are overwritten due to on-line changes in the codeword size (N) and or interleaver depth (D).

EXAMPLE 2

On-Line INP Adaptation FIP Setting

This section describes an example of FIP settings for On-Line INP adaptation for DSL. In this example only the Codeword Size (N) and the number of parity bytes in a codeword (R) are updated on line. The number of information bytes in a codeword (K) and Interleaver Depth (D) are not changed and therefore the user data rate does not change. This means that the latency (and interleaver memory size) and the line rate are modified on-line. Since N=K+R this places restrictions on the allowed values for K and R.

1st Setting—{Approximate User Data Rate=3.968 Mbps, Line Rate=4.096 Mbps, N=128, K=124, R=4, S=1, D=64, Latency=16 msec, INP=1}
2nd Setting—{Approximate User Data Rate=3.968 Mbps, Line Rate=4.224 Mbps, N=132, K=124, R=8, S=1, D=64, Latency=16 msec, INP=2}
3nd Setting—{Approximate User Data Rate=3.968 Mbps, Line Rate=4.480 N=128, K=124, R=16, S=1, D=64, Latency=16 msec, INP=4}

In this example the Line Rate is modified on-line. For this reason it is necessary to also complete a rate adaptation process in order to complete this On-Line INP adaptation. A method for Seamless Rate Adaptation is described in U.S. Pat. No. 6,498,808.

While these examples restrict the changes to a subset of the FIP parameters, they can obviously be extended to cover any combination of the FIP parameters (N, K, R and D). For example, the value of D could also be modified in addition to the values of K, R and N. This could result in a change in the required interleaver memory and latency. In order to keep the memory and latency constant it is necessary to change the codeword size (N) accordingly when changing the interleaver depth (D). For example, if the interleaver depths is changed from D=64 to D=128, the Codeword size would have to be decreased by a factor of 2 so that overall latency is constant.

Figure 2:
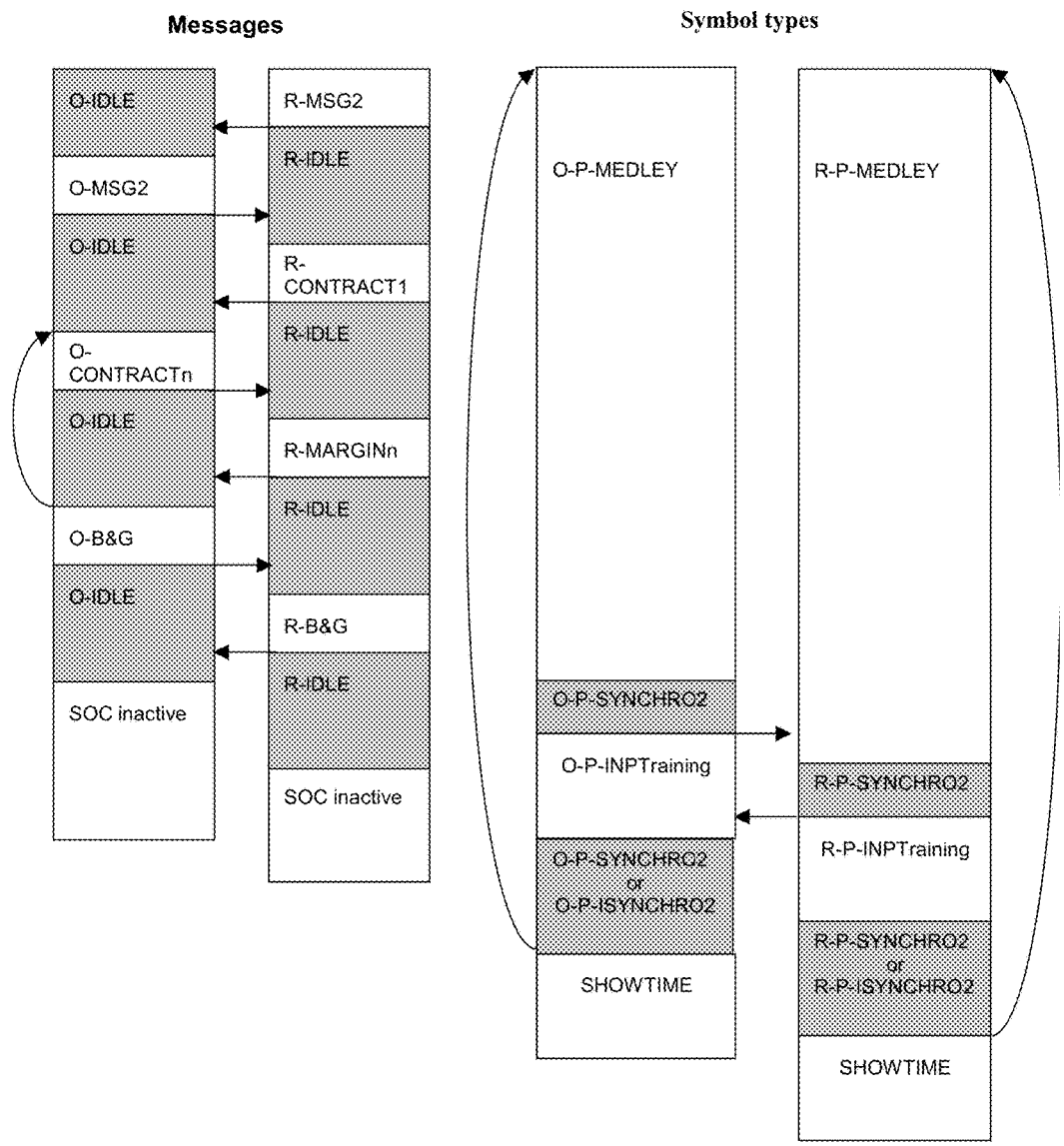
FIG. 2 illustrates an exemplary initialization state machine that includes an INPTraining state according to this invention.

FIG. 2 illustrates an exemplary modified initialization state machine that includes the INPTraining state prior to Showtime. This state machine is based on the VDSL G.993.1 ITU standard. As defined in G.993.1, VTU-O is the VDSL Transceiver Unit at the Optical Network Unit (ONU) and VTU-R is the VDSL Transceiver Unit at the Remote terminal. The Initialization state machine in FIG. 2 is an example of how INPTraining states could be included in a modified VDSL initialization procedure. While exemplary FIG. 1 includes the INPTraining state at a specific time in the initialization sequence, the INPTraining state can be included at any time during initialization provided that it is preceded by a state during which Showtime parameters are exchanged between the transceivers.

O-P-INPTrain

During the O-P-INPTrain State the VTU-O transmitter transmits DMT Symbols using the standard PMD, PMS-TC and TPS-TC SHOWTIME functions with parameters exchanged during the previous Exchange Phase. During this state, the TPS-TC transmits idle ATM cells, HDLC flags or 64/65 idle packets. SOC is inactive during this state.

This state is used by the VTU-R to determine the correct DS INP setting based on Impulse Noise conditions on the line. For example, the downstream CRC, FEC error detection, TPS-TC error detection capabilities, and other receiver functions can be used to determine whether the INP setting is adequate. The receiver can also use these receiver functions to determine the correct INP setting.

If the VTU-R determines that the current INP setting is not adequate, the VTU-R transmits the R-P-ISYNCHRO2 signal to indicate the need to transition back to the Exchange Phase in order to exchange new transmission parameters.

If the VTU-R determines that the current INP setting is not adequate, the VTU-R transmits the R-P-SYNCHRO2 signal to indicate that it is OK to transition to Showtime with the current transmission parameters.

R-P-INPTrain

During the R-P-INPTrain State the VTU-R transmitter transmits DMT Symbols using the standard PMD, PMS-TC and TPS-TC Showtime functions with parameters exchanged during the previous Exchange Phase. During this state, the TPS-TC transmits idle ATM cells, HDLS flags or 64/65 idle packets. SOC is inactive during this state.

This state is used by the VTU-O to determine the correct US INP setting based on Impulse Noise conditions on the line. For example, the upstream (US) CRC, FEC error detection, TPS-TC error detection capabilities, and other receiver functions can be used to determine whether the INP setting is adequate. The receiver can also use these receiver functions to determine the correct INP setting.

If the VTU-O determines that the current INP setting is not adequate, the VTU-O transmits the O-P-ISYNCHRO2 signal to indicate the need to transition back to the Exchange Phase in order to exchange new transmission parameters.

If the VTU-O determines that the current INP setting is not adequate, the VTU-O transmits the O-P-SYNCHRO2 signal to indicate that it is OK to transition to Showtime with the current transmission parameters.

O-P-SYNCHRO2

The O-P-SYNCHRO2 is the same as defined in the current VDSL1. As in VDSL1, the VTU-O transmitter enters Showtime after transmitting the O-P-SYNCHRO2 signal.

But, if the VTU-R has not also entered into Showtime, the VTU-O waits for receipt of the R-P-SYNCHRO2 or R-P-ISYNCHRO2. If the VTU-O receives the R-P-SYNCHRO2 it continues in Showtime. If the VTU-O receives the R-P-ISYNCHRO2, the VTU-O transmitter transitions back to the beginning of the O-P-MEDLEY state.

R-P-SYNCHRO2

The O-P-SYNCHRO2 is the same as defined in the current VDSL1. As in VDSL1, the VTU-R transmitter enters Showtime after transmitting the R-P-SYNCHRO2 signal.

But, if the VTU-O has not also entered into Showtime, the VTU-R waits for receipt of the O-P-SYNCHRO2 or O-P-ISYNCHRO2. If the VTU-R receives the O-P-SYNCHRO2 it continues in Showtime. If the VTU-R receives the O-P-ISYNCHRO2, the VTU-R transmitter transitions back to the beginning of the R-P-MEDLEY state.

O-P-ISYNCHRO2

The O-P-ISYNCHRO2 is phase-inverted version of the O-P-SYNCHRO2, i.e, a subcarrier-by-subcarrier 180 degrees phase reversal. The VTU-O transmitter transitions to the beginning of the O-P-MEDLEY state after transmitting the O-P-ISYNCHRO2 signal.

R-P-ISYNCHRO2

The R-P-ISYNCHRO2 is phase-inverted version of the R-P-SYNCHRO2, i.e., a subcarrier-by-subcarrier 180 degrees phase reversal. The VTU-R transmitter transitions to the beginning of the R-P-MEDLEY state after transmitting the R-P-ISYNCHRO2 signal Exemplary Overview State Transition Rules Based on SYNCHRO2 and the ISYNCHRO2 signals:
  If either the VTU-O or the VTU-R transmits the ISYN-CHRO2 signal then both VTU-R and VTU-O transition back to beginning of the MEDLEY state.
  If both the VTU-O and the VTU-R transmit the SYN-CHRO2 signal then both the VTU-R and the VTU-O transition into Showtime.

There are several important points regarding this exemplary embodiment. First, the receiver can measure the efficiency of the plurality of INP settings without completing a new initialization procedure such as is used in ADSL and VDSL systems. Second, the length of the time of the O-P-INPTrain and R-P-INPTrain states can be controlled by the VTU-R and VTU-O respectively. In this way the receivers have adequate time to determine if the current INP setting is correct. In order to accomplish this, prior to entering the R-P-INPTrain state, the VTU-O can transmit a message to the VTU-R indicating the minimum length of the R-P-INPTrain state. Likewise, prior to entering the O-P-INPTrain state, the VTU-R can transmit a message to the VTU-O indicating the minimum length of the O-P-INPTrain state. For example, the message could indicate that a minimum of 20000 DMT symbols should be sent during the O-P-INPTrain state. Additionally, the length of the time of the O-P-INPTrain and R-P-INPTrain states could be set by the DSL service provider in order to make sure that the initialization does not take too long or because the service provider may have some knowledge of the statistics of the impulse noise which require setting the length of the INP-Train states. In this exemplary case a message could be sent from the VTU-O to the VTU-R indicating the minimum and/or maximum length of the O-P-INPTrain and/or the R-P-INPTrain states. For example, the message could indicate that a minimum of 20000 DMT symbols should be sent during the R-P-INPTrain state. Also, for example, the message could indicate that a maximum of 40000 DMT symbols should be sent during the R-P-INPTrain state.

The length of the time of the O-P-INPTrain and R-P-INPTrain states could also be controlled by the VTU-O and VTU-R respectively. In this case, the transmitters will have control of the state lengths. In order to accomplish this, prior to entering the R-P-INPTrain state, the VTU-R can transmit a message to the VTU-O indicating the minimum length of the R-P-INPTrain state. Likewise, prior to entering the O-P-INPTrain state, the VTU-O can transmit a message to the VTU-R indicating the minimum length of the O-P-INPTrain state. For example, the message could indicate that a minimum of 20000 DMT symbols should be sent during the O-P-INPTrain state.

As discussed above, another exemplary aspect of this invention relates to determining the length and/or repetition period of impulse noise events in order to select an appropriate INP setting.

The INP length can be determined using any one of a plurality of metrics. For example, the INP length can be determined based on one or more of:
  1) The length of the impulse in time
  2) The number of received bits that are affected by the impulse noise
  3) The number of received ATM cells that are affected by the impulse noise
  4) The number of 64/65 packets that are affected by the impulse noise
  5) The number of received DMT symbols that are affected by the impulse noise
  6) The number of FEC codewords that are affected by the impulse noise As an example, assume that length of the impulse noise is 700 microseconds (Example 1). At a data rate of 1 Mbps this could correspond to an impulse noise length of 700 bits (Example 2) assuming that all impulse noise was high enough to affect all 700 bits in the 700 microsecond period. This also could correspond to a impulse noise length of 700/(53*8)=1.65 ATM cells since there are 53 bytes in a ATM cell (Example 3). This also could correspond to an impulse noise length of 700/(65*8)=1.35 64/65 packets since there are 65 bytes in a 64/65 packet (Example 4). This also could correspond to an impulse noise length of 700/(250)=2.8 DMT symbols (INP=2.8) assuming the DMT symbol rate is 4 kHz (250 microseconds DMT symbol length) (Example 5).

As an example, the determination of the INP length with the number of received bits that are affected by impulse noise can be performed in accordance with the following procedure. Initially, the transmitting modem 300 transmits data using at least one of the Showtime functions. In accordance with a first exemplary embodiment, at least the bit allocation table is used. In addition, or alternatively, the trellis coder, framer, and TPS-TC functions may also be used. Additionally, or alternatively still, the interleaving and FEC may also be used.

The receiving modem 200 receives data using at least one of the Showtime functions, such as the bit allocation table as discussed above. Similarly, the trellis coder, framer, TPS-TC and/or interleaving and FEC can be used.

The transmitter 300 then transmits a predefined bit pattern that is used for determining or measuring the impulse noise length based on detected erroneous bits. The receiving modem 200 compares, with the assistance of the impulse noise length determination module 240, the predefined bit pattern to the received bit pattern in order to detect bit errors. Since impulse noise events typically cause a burst of errors in a bit stream, the receiving modem 200 determines the length of the impulse noise event by detecting and determining the length of the error burst.

Once the receiver 200 determines the length of the impulse noise, the receiving modem 200, in cooperation with the message module 290, sends a message to the transmitter 300 that indicates the determined length of the impulse noise.

In accordance with an exemplary embodiment, the FEC correction capability and interleaving is turned off when trying to determine the length of the impulse noise, e.g., R=0 and D=1. Disabling the FEC and interleaving is beneficial when trying to determine the length of the impulse noise based on affected bits, affected code words, or affected packets. This is the case because if the FEC/interleaving is enabled, the impulse event can be spread over a large time period which makes it more difficult to determine the length of the original impulse.

The exemplary methodology discussed above can also be used to determine the length of the impulse event using other metrics. For example, a predefined bit pattern could be used in the payload of the ATM cells or the 64/65 packets. Idle packets or cells, which carry a predefined pattern, could also be used. In these cases, the receiver would compare the received data to the predefined data to determine the length of the impulse or to determine if an INP setting is adequate. Alternatively, the CRC of the ATM cell or 64/65 packet could be used to determine the length of the impulse noise. This would provide a courser measurement of the impulse noise length since it would be an integer number of packets or cells. In this example, a 700 bit impulse would cause CRC errors in two ATM cells so the length of the impulse noise would be two ATM cells, as opposed to the more precise measurement of 1.64 above. Likewise, in this example, a 700 bit impulse would cause CRC errors in two 64/65 packets so the length of the impulse noise would be two packets, as opposed to the more precise measure of 1.35 above.

Likewise, a predefined bit pattern could also be used to modulate the carriers in the DMT symbols so that the receiver would know what DMT symbols were transmitted. In this case, the receiver 200 would determine how many DMT symbols were corrupted by comparing the received signal with a known transmitted signal.

The exemplary techniques used to determine the length of the impulse noise event could also be extended to determine the repetition rate of the impulse noise event in cooperation with the impulse noise period determination module 250. In order to determine the repetition period of an impulse noise event, the receiver 200 detects the impulse noise event as discussed above and then determines how often they occur. For example, periodic impulse noise due to AC power lines occur at 120 Hz reception rates or approximately every 8 ms. The receiver 200 could, for example, also store information about past impulse noise events and compare detected impulse noise events to historical events. The impulse noise period determination module 250 could then determine which events of a similar duration are occurring at what interval. This information could then be used in determining an appropriate INP setting.

Once the receiver 200 determines the (maximum) length of the impulse and/or the repetition period of the impulse, the information, with the cooperation of the message module 290 can be sent to the transmitting modem. For example, when the receiving modem 200 determines the (maximum) length of the impulse and/or the repetition period of the impulse, the impulse noise period determination module 250, in cooperation with the message module 290 can forward information to the transmitting modem that quantifies this period. The transmitting modem 300 could provide this information to, for example, the management module 310, that would allow, for example, an operator or service provider to configure the modems. For example, based on the period information contained in the message, the operator may configure the modems to different INP values, data rates, latency, or the like.

The receiver 200 could also test a specific INP setting by detecting how many received bits are errored in a specific time period. For example, if the specific INP setting enables the correction of 100 bits in an 8 msec. time period then the receiver 200 could detect how many bits are errored in a sliding 8 msec. window. If less than 100 bits are detected in error in the 8 ms sliding window, then the INP setting is adequate.

If more than 100 bits are detected in error in a sliding window, then the INP setting is not adequate, and the FEC/interleaving needs to be changed to provide more error correction capability.

Likewise, instead of using the received number of bits that are effected by the impulse noise, the receiver could test a specific INP setting by detecting how many received ATM cells, 64/65 packets, DMT symbols, and/or FEC corrections are affected in a specific time period.

Figure 3:
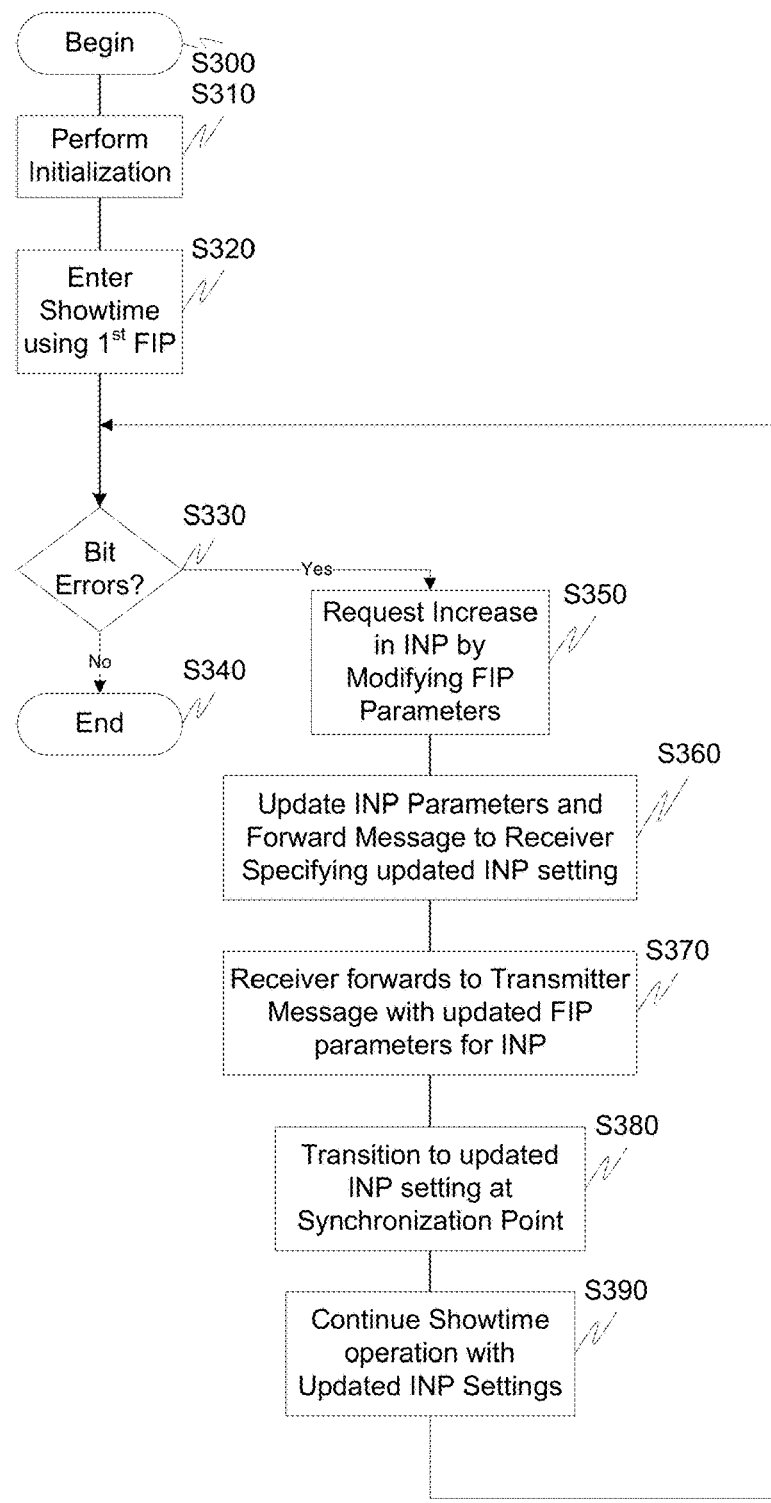
FIG. 3 is a flowchart outlining an exemplary method for impulse noise protection adaptation during Showtime according to this invention.

FIG. 3 outlines an exemplary method for performing impulse noise protection adaptation during Showtime according to this invention. In particular, control begins in step S300 and continues to step S310. In step S310, traditional DSL initialization occurs. Next, in step S320, Showtime is entered between the two modems using the first FIP setting that was determined during the initialization in step S310. Then, in step S330, a determination is made whether bit errors are occurring using the first FIP setting. If bit errors are not occurring, control continues to step S340 where the control sequence ends. Otherwise, control jumps to step S350.

In step S350, a determination is made that an increase of the INP setting is required that requires modification of the FIP parameters. Next, in step S360, updated INP parameter is determined and a message forwarded to the receiver specifying the new INP setting. Then, in step S370, the receiver forwards to the transmitter updated FIP parameters for the new impulse noise protection requirements. Control then continues to step S380.

In step S380, the transmitter and receiver transition to using the updated INP parameters at a synchronization point. Next, in step S390 Showtime operation continues. Control then continues back to step S330.

Figure 4:
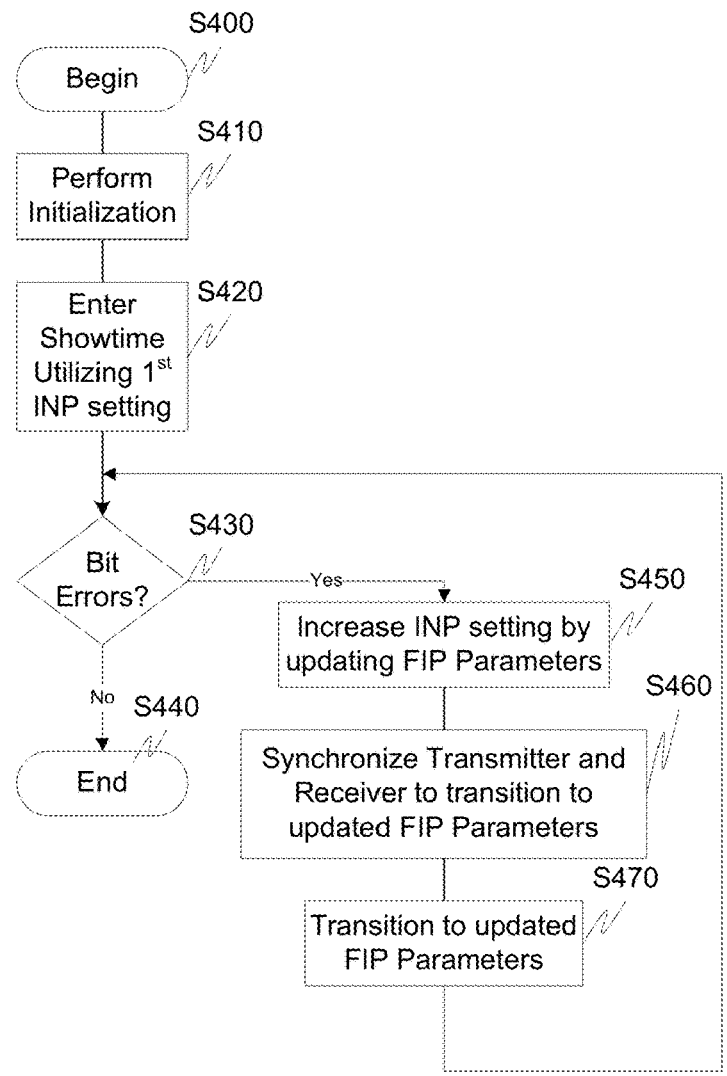
FIG. 4 is a flowchart illustrating an exemplary receiver optimized method for impulse noise protection adaptation according to this invention.

FIG. 4 outlines an exemplary method for receiver optimized impulse noise protection adaptation during Showtime. In particular, control begins in step S400 and continues to step S410. In step S410, the DSL system completes regular initialization In particular, control begins in step S400 and continues to step S410. In step S410, the DSL system completes startup initialization and continues into Showtime in step S420 using a first FIP setting. Control then continues to step S430 where a determination is made whether bit errors are occurring using the first FIP setting. If bit errors are not occurring, control continues to step S440 where the control sequence ends.

Otherwise, control jumps to step S450 where the receiver increases the impulse noise protection by modifying the FIP parameters. Next, in step S460, a synchronization point is determined between the transmitter and receiver, and when the synchronization point is reached both the transmitter and the receiver transition to the updated FIP setting in step S470 and Showtime communications continue and control returns back to step S430.

Figure 5:
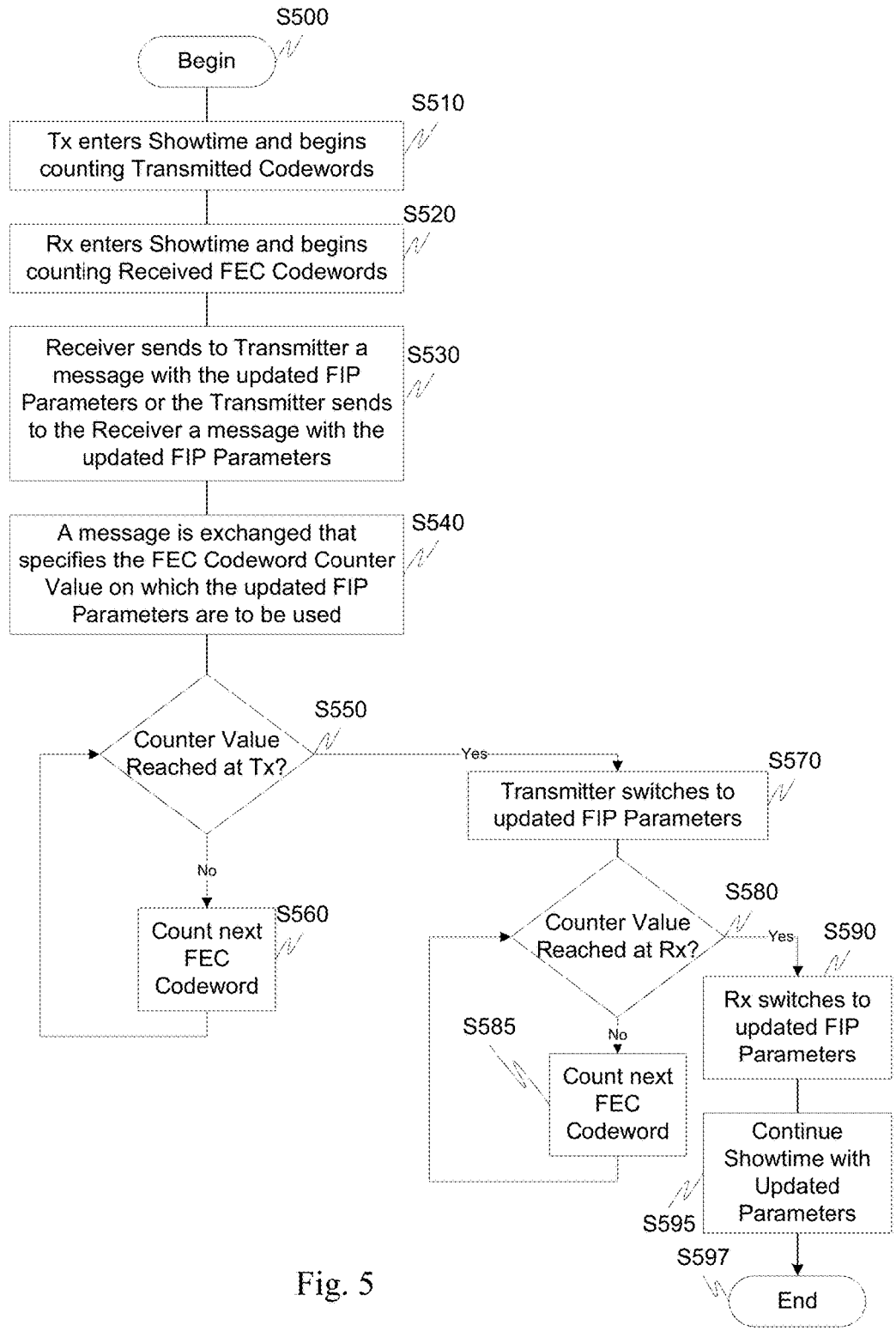
FIG. 5 is a flowchart illustrating an exemplary method for forward error correction synchronization according to this invention.

FIG. 5 illustrates an exemplary method for synchronization of the modified FEC and interleaving parameters according to this invention. In particular, control begins in step S500 and continues to step S510. In step S510, the transmitter enters Showtime and counts the number of transmitted FEC codewords. Next, in step S520, the receiver enters Showtime and counts the number of received FEC codewords. Then, in step S530, after a determination is made that an updated FIP setting is needed, the receiving modem sends a message to the transmitting modem indicating a new FIP setting that is to be used for transmitting and reception or, alternatively, the transmitting modem sends a message to the receiving modem indicating the new FIP setting to be used for transmission and reception. Control then continues to step S540.

In step S540, a message with the FEC codeword counter value on which the new FIP values are to be used is exchanged. Next, in step S550, a determination is made whether the counter value has been reached at the transmitter. If the counter value has not been reached, the next codeword is counted in step S560 and control continues back to step S550.

Otherwise, if the counter value has been reached, control jumps to step S570. In step S570, the transmitter transitions to the new FIP setting. Next, in step S580, a determination is made whether the counter value has been reached at the receiving modem. If the counter value has not been reached, the next received FEC codeword is counted in step S585 and control continues back to step S580. However, when the counter value has been reached in the receiving modem, control jumps to step S590 where the receiving modem switches to the new FIP value. Control then continues to step S595 where the modems continue Showtime communication and control continues to step S597 where the control sequence ends.

Figure 6:
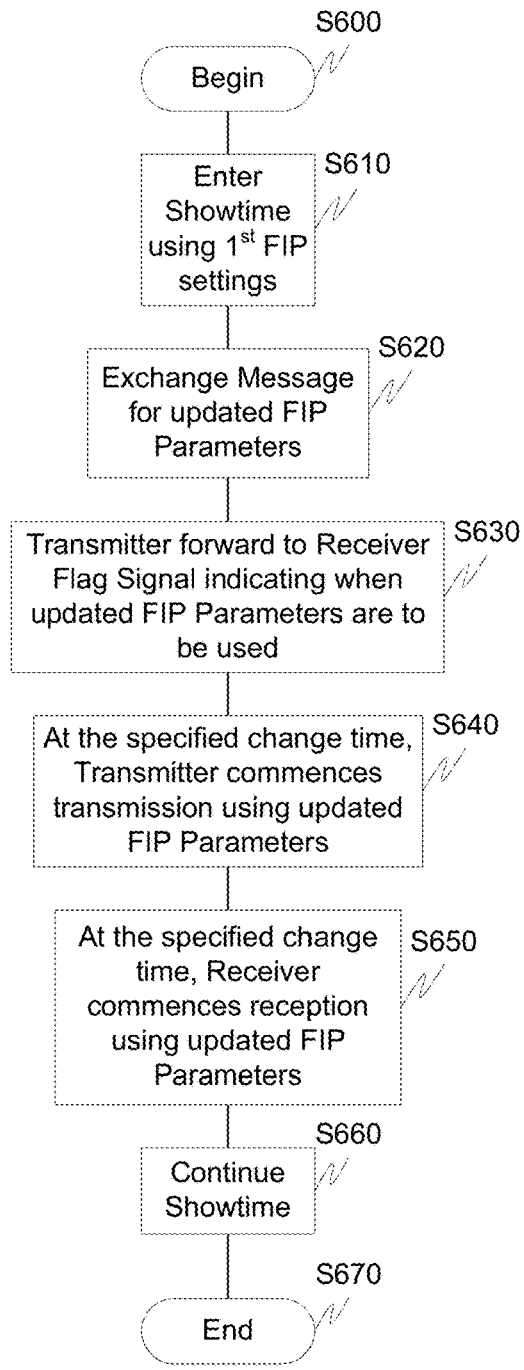
FIG. 6 is a flowchart illustrating an exemplary method for flag signal synchronization according to this invention.

FIG. 6 illustrates an exemplary method of synchronization using a flag signal according to this invention. In particular, control begins in step S600 and continues to step S610. In step S610, the modems enter Showtime using the first FIP parameters. Next, in step S620, a message is exchanged indicating the new FIP settings. Then, in step S630, the transmitter forwards to the receiver a flag signal indicating when the new FIP settings are to be used.

At step S640, and at a predefined change time following the transmission of the flag signal, the transmitter begins transmission using the new FIP parameters. Next, at step S650, at the predefined change time following the reception of the flag signal, the receiver commences reception utilizing the new FIP parameters. Control then continues to step S660 where Showtime communication continues with the control sequence ending at step S670.

Figure 7:
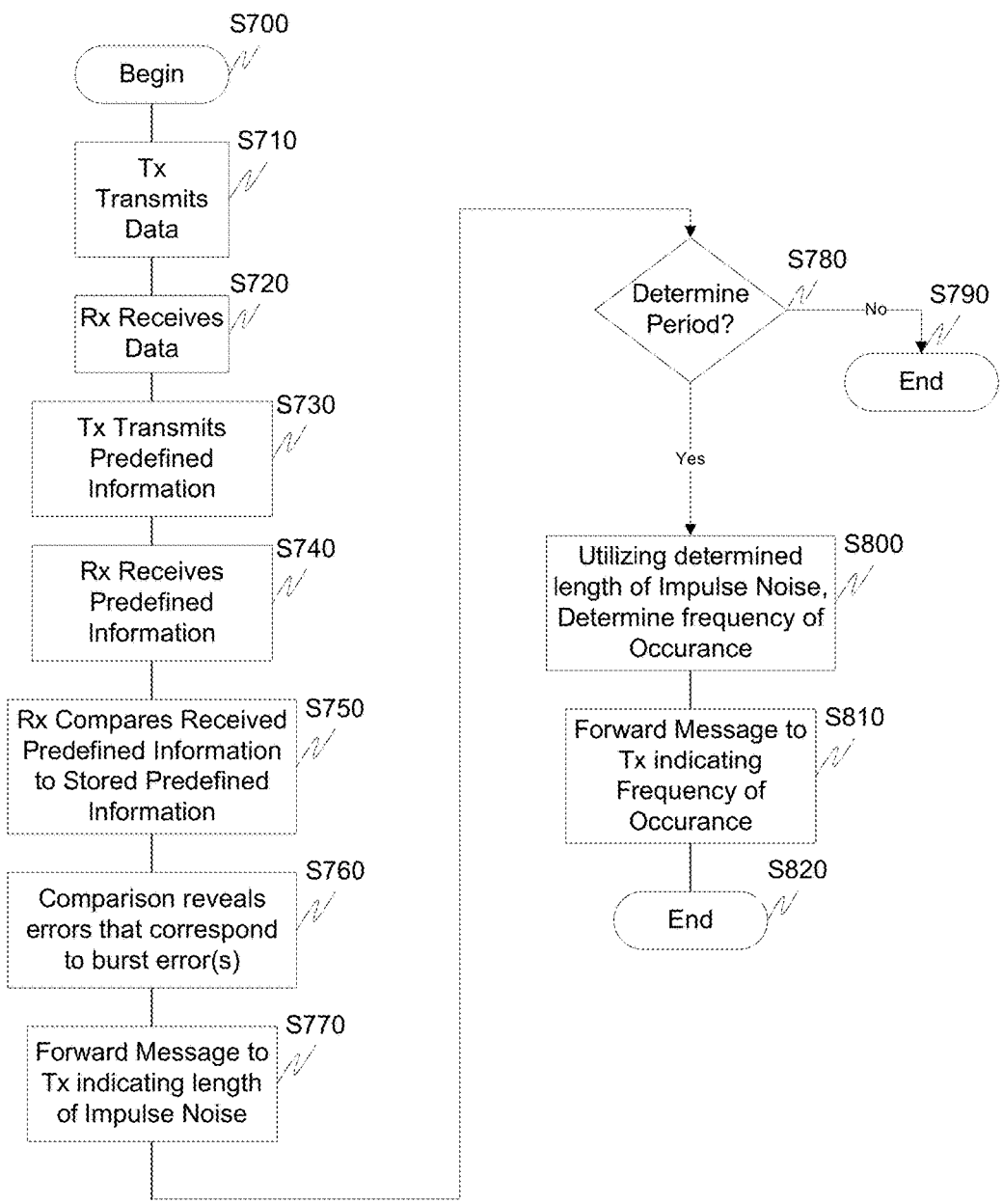
FIG. 7 is a flowchart illustrating an exemplary method for determining impulse noise length and period according to this invention.

FIG. 7 illustrates an exemplary method of impulse noise length and period determination. In particular, control begins in step S700 and continues to step S710. In step S710, the transmitter transmits data using at least one Showtime function. Next, in step S720, the receiver receives data using at least one Showtime function. Then, in step S730, the transmitter transmits predefined information to the receiver. Control then continues to step S740.

In step S740, the receiver receives the predefined information from the transmitter. Next, in step S750, the receiver compares the received predefined information to the predefined information and determines the differences (i.e., errors) between the two. Then, in step S760, and based on the detected errors, the length of the burst error is determined. Next, in step S770, a message is forwarded to the transmitter indicating the length of the impulse noise event. Control then continues to step S780 where a determination is made whether the period of the impulse noise event is also to be determined. If the period is not to be determined, control continues to step S790 where the control sequence ends. Otherwise, control jumps to step S800.

In step S800, and once the length of the impulse noise event is know, the receiver detects how often the impulse noise events occur. For example, historical information regarding the length and timing of previous impulse noise events can be stored in a memory (not shown). Then, a comparison can be made with the aid of a processor (not shown) to compare an impulse noise event to the historical information to determine the period of repetition (if any) of similar impulse noise events and, for example, a message indicating the period as well as the timing forwarded to, for example, another transceiver, the CO, or in general any destination as appropriate. Thus, in a similar manner, this information can be forwarded in step S810 to, for example, the transmitter in a message specifying the repetition frequency of the impulse noise event. Control then continues to step S820 where the control sequence ends.

The above-described system can be implemented on wired and/or wireless telecommunications device(s), such a modem, a multicarrier modem, a DSL modem, an ADSL modem, an xDSL modem, a VDSL modem, a linecard, test equipment, a multicarrier transceiver, a wired and/or wireless wide/local area network system, a satellite communication system, a modem equipped with diagnostic capabilities, or the like, or on a separate programmed general purpose computer having a communications device.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, modem, transmitter/receiver, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein however can be readily implemented in hardware and/or software, or any means, using any known or later developed systems or structures, devices and/or software by those of ordinary skill in the applicable art from the functional description provided herein and with a general basic knowledge of the computer and telecommunications arts.

Moreover, the disclosed methods may be readily implemented in software, that can be stored on a storage medium, and executed on programmed general-purpose computer, a special purpose computer, a microprocessor, or the like. In these instances, the systems and methods of this invention can be implemented as a program embedded on personal computer such as JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided, in accordance with the present invention, systems and methods for impulse noise adaptation. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. In a transceiver, a method of adapting an impulse noise protection capability during steady-state communication comprising:
receiving, during steady-state communication, using a first forward error correction and interleaving parameter (FIP) setting that comprises a forward error correction (FEC) codeword size and a first number of FEC coding parity bytes; and
switching, during the steady-state communication, to receiving using a second FIP setting that comprises a second FEC codeword size that is different than the first FEC codeword size and a second number of FEC coding parity bytes that is different than the first number of FEC coding parity bytes,
wherein the switching to receiving using the second FEC codeword size and the second number of FEC coding parity bytes is based on a counter reaching a value.

2. The method of claim 1, wherein the counter is a counter of FEC codewords.

3. The method of claim 1, wherein the switching to receiving using the second FEC codeword size and the second number of FEC coding parity bytes does not cause bit errors or service interruption.

4. The method of claim 1, wherein the switching to receiving using the second FEC codeword size and the second number of FEC coding parity bytes is associated with at least one of an impulse noise protection value, a data rate and a latency value.

5. The method of claim 1, wherein the switching to receiving using the second FEC codeword size and the second number of FEC coding parity bytes is associated with a service provider configuration.

6. The method of claim 1, wherein an interleaver depth does not change during the switching.

7. The method of claim 1, wherein a data rate and/or latency do not change when switching to receiving using the second FEC codeword size and the second number of FEC coding parity bytes.

8. A transceiver comprising:
a receiver operable to receiving, during steady-state communication, using a first forward error correction and interleaving parameter (FIP) setting that comprises a forward error correction (FEC) codeword size and a first number of FEC coding parity bytes; and
the receiver further operable to switch, during the steady-state communication, to receiving using a second FIP setting that comprises a second FEC codeword size that is different than the first FEC codeword size and a second number of FEC coding parity bytes that is different than the first number of FEC coding parity bytes,
wherein the switching to receiving using the second FEC codeword size and the second number of FEC coding parity bytes is based on a counter reaching a value.

9. The transceiver of claim 8, wherein the counter is a counter of FEC codewords.

10. The transceiver of claim 8, wherein the switching to receiving using the second FEC codeword size and the second number of FEC coding parity bytes does not cause bit errors or service interruption.

11. The transceiver of claim 8, wherein the switching to receiving using the second FEC codeword size and the second number of FEC coding parity bytes is associated with at least one of an impulse noise protection value, a data rate and a latency value.

12. The transceiver of claim 8, wherein the switching to receiving using the second FEC codeword size and the second number of FEC coding parity bytes is associated with a service provider configuration.

13. The transceiver of claim 8, wherein an interleaver depth does not change during the switching.

14. The transceiver of claim 8, wherein a data rate and/or latency do not change when switching to receiving using the second FEC codeword size and the second number of FEC coding parity bytes.

15. A transceiver comprising:
means for receiving, during steady-state communication, using first forward error correction and interleaving parameter (FIP) setting that comprises a forward error correction (FEC) codeword size and a first number of FEC coding parity bytes; and
means for switching, during the steady-state communication, to receiving using a second FIP setting that comprises a second FEC codeword size that is different than the first FEC codeword size and a second number of FEC coding parity bytes that is different than the first number of FEC coding parity bytes,
wherein the switching to receiving using the second FEC codeword size and the second number of FEC coding parity bytes is based on a counter reaching a value.

16. The transceiver of claim 15, wherein the counter is a counter of FEC codewords.

17. The transceiver of claim 15, wherein the switching to receiving using the second FEC codeword size and the second number of FEC coding parity bytes does not cause bit errors or service interruption.

18. The transceiver of claim 15, wherein the switching to receiving using the second FEC codeword size and the second number of FEC coding parity bytes is associated with at least one of an impulse noise protection value, a data rate and a latency value.

19. The transceiver of claim 15, wherein the switching to receiving using the second FEC codeword size and the second number of FEC coding parity bytes is associated with a service provider configuration.

20. The transceiver of claim 15, wherein an interleaver depth does not change during the switching.

21. The transceiver of claim 5, wherein a data rate and/or latency do not change when switching to receiving using the second FEC codeword size and the second number of FEC coding parity bytes.

* * * * *

(12) INTER PARTES REVIEW CERTIFICATE (3298th)
United States Patent
Tzannes

(10) Number: US 10,567,112 K1
(45) Certificate Issued: Oct. 31, 2023

(54) IMPULSE NOISE MANAGEMENT

(71) Applicant: Marcos C. Tzannes

(72) Inventor: Marcos C. Tzannes

Trial Number:

IPR2022-00470 filed Jan. 28, 2022

Inter Partes Review Certificate for:

Patent No.: 10,567,112
Issued: Feb. 18, 2020
Appl. No.: 16/126,027
Filed: Sep. 10, 2018

The results of IPR2022-00470 are reflected in this inter partes review certificate under 35 U.S.C. 318(b).

INTER PARTES REVIEW CERTIFICATE
U.S. Patent 10,567,112 K1
Trial No. IPR2022-00470
Certificate Issued Oct. 31, 2023

AS A RESULT OF THE INTER PARTES REVIEW PROCEEDING, IT HAS BEEN DETERMINED THAT:

Claims 1, 3-5, 7, 8, 10-12 and 14 are cancelled.

\* \* \* \* \*